(12) United States Patent  
Dybdal et al.

(10) Patent No.: US 8,614,940 B1  
(45) Date of Patent: Dec. 24, 2013

(54) SYSTEMS AND METHODS FOR REDUCING NARROW BANDWIDTH INTERFERENCE CONTAINED IN BROAD BANDWIDTH SIGNALS

(71) Applicant: The Aerospace Corporation, El Segundo, CA (US)

(72) Inventors: Robert Bernhard Dybdal, Palos Verdes, CA (US); Christopher Joseph Clark, Hermosa Beach, CA (US); Samuel Joseph Curry, Redondo Beach, CA (US); Lan Xu, Cerritos, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 13/676,645

(22) Filed: Nov. 14, 2012

(51) Int. Cl.  
*H04J 11/00* (2006.01)

(52) U.S. Cl.  
USPC ............................. 370/210; 370/536; 370/542

(58) Field of Classification Search  
USPC .......................................... 370/210, 536, 542  
See application file for complete search history.

(56) References Cited

U.S. PATENT DOCUMENTS

| | | | |
|---|---|---|---|
| 5,263,048 A | 11/1993 | Wade | |
| 5,479,440 A | 12/1995 | Esfahani | |
| 6,975,673 B1 * | 12/2005 | Rouquette | 375/149 |
| 7,277,475 B1 * | 10/2007 | Nguyen et al. | 375/148 |
| 7,894,556 B2 | 2/2011 | Casabona et al. | |
| 8,275,067 B2 * | 9/2012 | Garg et al. | 375/296 |
| 2005/0047487 A1 * | 3/2005 | Sakaue et al. | 375/148 |
| 2006/0291375 A1 | 12/2006 | Nishikawa | |

* cited by examiner

Primary Examiner — Phuc Tran  
(74) Attorney, Agent, or Firm — Jones Day; Jaime D. Choi

(57) ABSTRACT

Under one aspect of the present invention, a system for processing a group of signals and interference includes (a) an analog-to-digital (A/D) converter for digitizing the group of signals and the interference; (b) a Fourier transform circuit for obtaining a Fourier transform of the digitized group of signals and the interference and to provide as output spectral bins, at least one of which contains the interference; (c) a power analysis circuit for comparing the collective power level of the spectral bins to a predetermined threshold, and if the collective power level exceeds the predetermined threshold, and for excising at least one bin that contains the interference; and (d) an inverse Fourier transform circuit for obtaining an inverse Fourier transform of the remaining spectral bins and outputting a digitized group of signals less the interference in any excised spectral bin.

25 Claims, 12 Drawing Sheets

SYSTEMS AND METHODS FOR REDUCING NARROW BANDWIDTH INTERFERENCE CONTAINED IN BROAD BANDWIDTH SIGNALS

STATEMENT OF GOVERNMENT INTEREST

This invention was made with government support under Contract No. FA8802-09-C-0001 awarded by the Department of the Air Force. The government has certain rights in the invention.

FIELD OF THE INVENTION

This application generally relates to systems and methods for reducing interference contained in signals.

BACKGROUND OF THE INVENTION

A receiver may be configured to receive and process signals that have broad bandwidth spectra and powers within a certain, expected, range. For example, a receiver on a satellite may be configured to receive a group of signals that share a common region of the electromagnetic spectrum, and are multiplexed with one another using techniques known in the art. In the multiplexing technique known as code division multiple access (CDMA), each signal of the group is encoded with a unique code, and spread over the same selected portion of the spectrum as the other signals in the group. The receiver receives the group of signals, and then decodes one or more of the signals from others in the group using a priori knowledge about the unique code(s) of those signals. Alternatively, in the multiplexing technique known as frequency-division multiple access (FDMA), each signal of the group is assigned a different sub-portion of the region of the spectrum than the other signals in the group. The receiver receives and processes the group of signals, and then differentiates one or more of the signals from others in the group using a priori knowledge about the spectral sub-portion(s) of those signals. The groups of signals received in both CDMA and FDMA may be considered "broad bandwidth" signals because the groups of signals occupy a portion of the electromagnetic spectrum that is significantly broader than normally would be used for a single, non-multiplexed signal, that is, a "narrow bandwidth" signal.

In both CDMA and FDMA, the overall power of the group of signals received by the receiver preferably is sufficiently higher than any noise sources that may be present to yield a sufficient signal-to-noise ratio (SNR) to communicate signals with adequate fidelity as measured by BER (Bit Error Rate) values. At the same time, the overall power of the group of signals also preferably is sufficiently low that the receiver may process the signals without distortion. Specifically, as is known in the art, receivers have a linear range of operation and a nonlinear range of operation. If a signal input to the receiver has a power that falls within the linear range of the receiver, then the receiver processes the received signal collection without distortion. However, if a signal input to the receiver has a power that falls within the nonlinear range of the receiver, then the received signal collection is distorted and communication performance is degraded.

Signals other than the desired group of signals that the receiver receives may be referred to as "interference," may be intentional or unintentional, and may have a broad bandwidth or a narrow bandwidth. If the receiver receives interference that falls within the same portion of the electromagnetic spectrum as the desired group of signals, then the receiver may not distinguish the interference from the group of signals again degrading communication performance. However, if the power of the interference is sufficiently high that nonlinear receiver operation occurs, not only may the interference obscure desired spectral components but also cause additional signal distortion. This additional receiver distortion may include suppression of desired signals and generation of intermodulation products between design signal components and the interference, resulting in additional degradation in receiver performance.

A receiver may have features intended to reduce the effects of such interference. For example, the receiver may be designed so as to increase its linear range, and thus reduce the risk that interference may cause distortion, e.g., by providing circuitry that remains linear at higher input power levels. However, increasing the linear range of the receiver may be expensive, and also may require a larger power supply to operate the modified circuitry.

Another known approach for reducing the effect of narrow bandwidth interference on reception of a broad bandwidth desired signal uses adaptive notch filter techniques. Specifically, a notch filter may be applied to the received signal prior to amplification so as to block the region of the spectrum where the interference is located. The amplitude, width, and spectral location of the notch filter may be adaptively modified over time by varying weighting coefficients, which may be iteratively derived using a gradient process based on an optimization criterion, such as maximum signal to noise plus interference ratio (SNIR). Such adaptive notch filter techniques have been widely applied. However, its iterative nature makes this approach is relatively slow, and thus less able to respond to rapidly changing interference.

The CDMA signal format is an example of spread spectrum modulation wherein user signals are spread over a much wider bandwidth than needed to convey the information in the user's signal. One advantage of spread spectrum modulation is protection from interference achieved by processing the user-unique codes. Similar interference protection may be achieved in FDMA formats by frequency hopping the user assigned frequency slots over a wide bandwidth in a pseudo-random sequence of frequency hop codes known to both the sender and receiver. Signal error correcting coding and interleaving techniques further add to the interference protection and are commonly used. These interference protection techniques are known in the art, but their benefits depend on linear receiver operation. The effectiveness of these techniques is significantly degraded by receiver nonlinearities.

Thus, what is needed is a method of reducing the effects of interference with broad bandwidth signals while maintaining linear receiver operation.

SUMMARY OF THE INVENTION

Embodiments of the present invention provide systems and methods for reducing narrow bandwidth interference contained in broad bandwidth signals. Specifically, embodiments of the present invention remove relatively high-power, narrow bandwidth interference contained in a broad bandwidth, desired signal after the composite of the two are received, for example by obtaining a Fourier transform of the composite signal and then identifying and excising spectral regions that have particularly high power levels. Following such excision, an inverse Fourier transform may be obtained, the result of which is a signal having reduced interference. Preferably, the spectral regions to be excised are selected based on the overall power levels of the broad bandwidth desired signal, so as to maintain such power levels within the linear operating range of electronic components to which the processed signal subsequently may be provided.

Under one aspect of the present invention, a system for processing a group of signals and interference includes (a) an analog-to-digital (A/D) converter configured to digitize the group of signals and the interference; (b) a Fourier transform circuit coupled to the A/D converter and configured to obtain a Fourier transform of the digitized group of signals and the interference and to provide as output spectral bins, each bin having a power level, at least some of the bins respectively containing portions of the digitized group of signals, and at least one of the bins containing the interference; (c) a power analysis circuit configured to compare the collective power level of the spectral bins output by the Fourier transform circuit to a predetermined threshold, and if the collective power level exceeds the predetermined threshold, and to excise at least one bin that contains the interference; and (d) an inverse Fourier transform circuit configured to obtain an inverse Fourier transform of the remaining spectral bins and to provide as output a digitized group of signals in the time-domain less the interference in any excised spectral bin.

In some embodiments, the A/D converter and Fourier transform circuit are configured to ensure that the group of signals and the interference are within the linear range of these components, e.g., fall within the A/D converter's digital quantization level. In some embodiments, the system also includes an analog conditioner circuit configured to ensure that the group of signals and the interference are within the conditioner's linear range.

In some embodiments, the power analysis circuit is configured to obtain a dynamically defined threshold having a value that, if spectral bins having power levels exceeding that threshold are excised, would reduce the collective power to or below the predetermined threshold. The power analysis circuit may be configured to excise spectral bins having power levels that exceed the dynamically defined threshold. For example, the power analysis circuit may include a first arithmetic circuit configured to obtain the collective power level, a storage medium configured to store the predetermined threshold, and a first comparator configured to compare the collective power level to the stored predetermined threshold. The power analysis circuit further may include a second arithmetic circuit configured to obtain the dynamically defined threshold, and a second comparator configured to compare the power level of each bin to the dynamically defined threshold and to excise any bin whose power level exceeds that threshold. In some embodiments, the power analysis circuit includes a field programmable gate array (FPGA) or application specific integrated circuit (ASIC) suitably programmed so as to include the first and second arithmetic circuits, the storage medium, and the first and second comparators.

The power analysis circuit may be configured to excise the spectral bins having power levels that exceed the dynamically defined threshold by setting the power levels of those bins to zero.

In some embodiments, the power analysis circuit further also may be configured to compare the power level of each spectral bin to an empty bin threshold, and if the power level of a bin is less than the empty bin threshold, excising that bin.

The group of signals may include code-division multiple access (CDMA) or frequency-division multiple access (FDMA)-based signals, for example.

Some embodiments further include a multiplexer configured to multiplex the digitized group of signals output by at least one antenna, and at least one router configured to route the multiplexed signals to the at least one antenna based on the intended destination thereof. In this case, the receiver may be a part of a transponder that relays a group of signals to another location(s), e.g., such as the transponder in a communication satellite or wireless network. In other embodiments, the receiver may be equipped with demodulator(s) to obtain the information contained in one or more signals, e.g., as would be the case where individual system users demodulate signals of interest for their own purposes.

Under another aspect of the present invention, a method of processing a received group of signals and interference includes (a) digitizing the received group of signals and the interference; (b) obtaining a Fourier transform of the digitized group of signals and the interference to output spectral bins, each bin having a power level, at least some of the bins respectively containing portions of the digitized group of signals, and at least one of the bins containing the interference; (c) comparing the collective power level of the spectral bins to a predetermined threshold, and if the collective power level exceeds the predetermined threshold, excising at least one bin that contains the interference; and (d) obtaining an inverse Fourier transform of the remaining spectral bins and providing as output a digitized group of signals less the interference in any excised spectral bin.

DETAILED DESCRIPTION

Figure 1A:
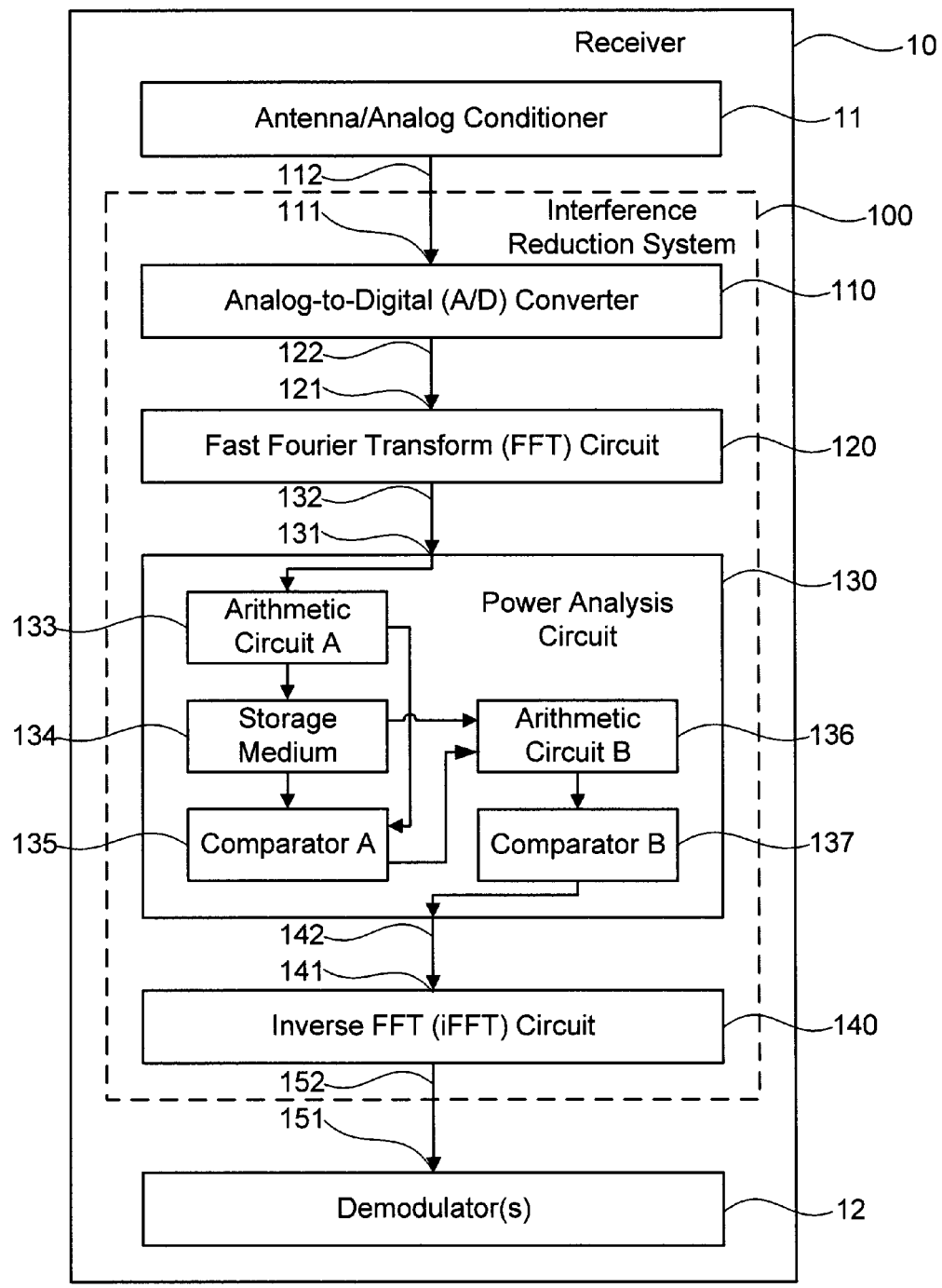
FIG. 1A illustrates a system for reducing interference in a receiver, according to some embodiments of the present invention.

Embodiments of the present invention provide systems and methods for reducing narrow bandwidth interference with broad bandwidth signals, such as a group of signals that are multiplexed with each other and that share a common portion of the electromagnetic spectrum. As described above, if a receiver receives both desired broad bandwidth signals and high level narrow bandwidth interference, the composite of the signals and interference may result in nonlinear receiver operation distorting the desired broad bandwidth signals, thus reducing the receiver's ability to retrieve information from the desired signals, e.g., to distinguish the multiplexed signals from one another. The present invention reduces the effect of such interference by removing spectral components of such interference in real-time. Specifically, the present invention digitizes the received signal collection and any interference into quantized levels, and then Fourier transforms these digitized signals to obtain a plurality of spectral bins. Each frequency bin has an intensity that corresponds to the composite power of any signal or interference components that fall within the frequency bin. Some, if not all, of the spectral bins contain spectrally resolved portions of the digitized group of signals. Additionally, at least one spectral bin contains the interference, and indeed multiple bins may contain interference, depending on the spectral content of the interference.

The present invention provides that any spectral bins that contain interference may be excised, if such bins contain a particularly high power and if the collective power level of all of the bins, together, exceeds a predetermined threshold. Excising interference-containing bins when both of such conditions are met may be useful because if the collective power level of all of the bins is sufficiently low that the receiver operates within its linear range, then any interference present may not necessarily cause additional distortion of the desired signals. In contrast, if the collective power of all of the bins is relatively high, running the risk that the receiver may operate within its nonlinear range, then such power level may be used as a signal that interference is present. Appropriate circuitry within the receiver may identify any interference present based on its power level, which may be relatively high as compared to the desired group of signals. Any bins so identified as having interference may be excised, e.g., set to zero, and the remaining bins then inverse Fourier transformed to obtain the digitized signals—less at least some of the interference—in the time domain. After high level interference is excised, the dynamic range of the remaining signal collection is reduced from its previous value when high level interference was present. This reduced dynamic range after interference excision of high level interference advantageously reduces the power consumption of the electronics following the interference excision. The present invention thus may in some circumstances be viewed as a dynamic digital prefilter to maintain linear receiver operation.

First, an overview of the inventive system and components therein will be provided. Then, methods of using such a system, and signals processed thereby, will be described. Lastly, some alternative embodiments and exemplary applications of the present invention will be described.

FIG. 1A illustrates a system 100 for reducing narrow bandwidth interference with broad bandwidth signals in a receiver, according to some embodiments of the present invention. Specifically, receiver 10 may include an antenna/analog conditioner 11 configured to receive signals, one or more demodulators 12 configured to decode the information contained within the received signals, and interference reduction system 100 disposed therebetween. In the illustrated embodiment, interference reduction system 100 includes analog-to-digital (A/D) converter 110 configured to receive and digitize signals received by antenna/analog conditioner 11, fast Fourier transform (FFT) circuit 120 configured to receive and perform an FFT of the digitized signals output by A/D converter 110, power analysis circuit 130 configured to receive, analyze, and reduce interference contributions to the Fourier transformed signals output by FFT circuit, and inverse FFT (iFFT) circuit 140 configured to transform the processed signals output by power analysis circuit 130 back into the time domain. In the embodiment illustrated in FIG. 1A, iFFT circuit 140 may be configured to output the inverse-transformed signals to one or more demodulators 12 of receiver 10.

Antenna/analog conditioner 11 illustrated in FIG. 1A may be configured to wirelessly receive a group of signals within a particular frequency band or bands. For example, antenna/analog conditioner 11 may be configured to receive analog CDMA or FDMA signals that fall within a pre-defined spectral band, and may include one or more filters configured to block signals having frequencies that fall outside of this band. Appropriate antenna designs for a variety of signals in a variety of contexts, e.g., terrestrial, aircraft, or space-based antennas, are known in the art. In some embodiments, antenna/analog conditioner 11 may be a pre-existing structure to which inventive system 100 may be coupled.

Antenna/analog conditioner 11 also may include an input RF filter to select the bandwidth containing desired signal components and reject other signals at frequencies outside of that bandwidth, a low noise amplifier to establish the system noise level, and may contain one or more downconverters to translate the RF bandwidth containing the user signals into the bandwidth over which the A/D 110 operates. Such components may be considered together to constitute analog conditioning circuitry.

A/D converter 110 may include input port 111 configured to be coupled to antenna/analog conditioner 11 via conductive element 112, such that A/D converter receives any analog signals received by antenna/analog conditioner 11. Conductive element 112 may include, for example, a coaxial cable, a transmission line, or any other suitable conductor configured to transmit signals within the pre-defined spectral band from antenna/analog conditioner 11 to A/D converter 110 via input port 111. A/D converter 110 is configured to digitize and quantize the signals that it receives from antenna/analog conditioner 11. As known to those of skill in the art of digital signal processing, A/D converters are commercially available devices that generate a digital version of an analog signal by sampling that signal at a specified rate, and mapping the power levels of that analog signal onto quantization levels in a digital data stream. A/D converters may have a fixed resolution, that is, may have a fixed number of quantization levels onto which it may map the power levels of the analog signal. For example, A/D converters with an 8-bit resolution may be configured to map analog power levels onto 255 quantization levels. Note that in some embodiments, antenna/analog conditioner 11 may include its own A/D converter configured to digitize the received signals, or even may receive the desired group of signals in a digital format, in which circumstances A/D converter 110 may be omitted from system 100, and antenna/analog conditioner 11 instead may be directly coupled to FFT circuit 120. In embodiments including A/D converter 110, the converter provides as output to FFT circuit 120 via input port 121 of FFT circuit 120 and conductive element 122 a digitized, quantized version of the desired group of signals, and a digitized, quantized version of any interference that shares the same spectral band as the desired group of signals (e.g., that was not filtered out by antenna/analog conditioner 11 nor removed as a product of digitization or quantization).

As is known in the art, a discrete Fourier transform (DFT) may be used to determine the frequency components of a signal that varies in time. An FFT is a particular variant of DFT, in which the input signal has a number of points N that is a power of two, and is Fourier transformed using an algorithm that is particularly efficient at obtaining a DFT of an input signal having a number of points that is a power of two, such as the Cooley-Tukey algorithms known in the art. The output of a DFT is a spectrally resolved version of the input signal, in which different spectral components of the incoming signal are mapped onto a predefined number (e.g., for an FFT, a power of two) of spectral "bins." In some embodiments, the signal output by A/D converter 110 has a number of points N that is a power of two, and FFT circuit 120 is configured to perform an FFT on that signal. Circuits for performing FFTs, as well as other types of Fourier transformations of digital signals, are known in the art and are commercially available. In some embodiments, FFT circuit 120 provides as output a plurality of spectral bins, at least some of which contain portions of the digitized group of signals, and at least one of which contains interference. Each bin has a power level corresponding to the summed power levels of any spectral components—be they based on the desired group of signals or based on the interference—that have been mapped to that bin. FFT circuit 120 provides such spectral bins to input port 131 of power analysis circuit 130 via conductive element 132.

Preferably, antenna/analog conditioner 11, A/D converter 110, and FFT circuitry 120 are configured so as to ensure that linear operation is maintained prior to interference excision for the highest anticipated interference level. Preferably, the analog components (e.g., antenna/analog conditioner 11) have a suffficently high 1 dB compression value relative to the input to maintain linear operation. In practice, the gain distribution may be examined and in some cases, the receiver noise temperature may be increased somewhat by reducing the analog gain values to achieve the required linearity. The clipping levels and quantization used in the digital technology (e.g., A/D converter 110 and FFT circuitry 120) likewise may be selected to avoid digital overflow or nonlinear operation in the digital technology used prior to interference excision.

Power analysis circuit 130 is configured to excise one or more of the spectral bins that it receives from FFT circuit 120 based both on the collective power of all of the bins, and based on the power of each bin individually. By "excise" it is meant that power analysis circuit 130 reduces the power levels of such spectral bins to about zero in some embodiments, or to a predetermined non-zero level in other embodiments. Specifically, power analysis circuit 130 is configured to compare the collective power of all of the bins to a predefined threshold, which preferably is based on the linear range of operation of one or more demodulators 12. In one illustrative example, if the demodulator is limited to a maximum input signal level to achieve the required demodulation linearity, then the predefined threshold may be established to limit the signal power output from iFFT circuit 140 to demodulator(s) 12 to somewhat less than the maximum demodulator input level, e.g., to 95% or less, or 90% or less, or 85% of less, than the maximum demodulator input level. If power analysis circuit 130 determines that the collective power level of all of the bins exceeds the predetermined threshold, then the circuit establishes a dynamically defined threshold selected to facilitate identification and excision of interference that may be present, while reducing the risk that the desired group of signals also may be excised. To do so, power analysis circuit 130 may determine the amount by which the collective power level of all of the bins must be reduced to satisfy the predetermined threshold, and then may establish the dynamically defined threshold at such a value that, if bins having powers exceeding that threshold are excised, it would reduce the collective power to or below the predetermined threshold. Power analysis circuit 130 then may excise any bins that exceed the dynamically defined threshold, e.g., by setting the power levels of such bins to zero.

Power analysis circuit 130 may include any suitable circuitry configured to store the predefined threshold, to compare the collective power of the spectral bins to the predefined threshold, to establish the dynamically defined threshold, and to excise any bins that exceed the dynamically defined threshold. For example, in the embodiment illustrated in FIG. 1A, power analysis circuit 130 may include arithmetic circuit A 133, storage medium 134, comparator A 135, arithmetic circuit B 136, and comparator B 137. Arithmetic circuit A 133 may be configured to obtain the spectral bins output by FFT circuit 120, e.g., via conductive element 132 and any other suitable conductors, and to sum the power levels of the spectral bins so as to obtain a collective power level of the bins. Storage medium 134 may be configured to store the predefined threshold. In some embodiments, the predefined threshold is based on the known linearity characteristics of circuitry in demodulator(s) 12, which may be established at the time receiver 10 is designed and constructed. Comparator A 135 may be coupled, e.g., via appropriate conductive elements, to storage medium 134, from which it receives the predefined threshold, and to arithmetic circuit A 133, from which it receives the spectral bins as well as the collective power level of the spectral bins. Comparator A 135 may be configured to compare the collective power of the spectral bins to the predefined threshold.

Comparator A 135 also may be coupled to arithmetic circuit B 136, e.g., via an appropriate conductive element, so as to provide to arithmetic circuit B 136 with the spectral bins, as well as a signal indicating the amount (if any) by which the collective power of the spectral bins exceeds the predefined threshold. Arithmetic circuit B 136 also may receive the predefined threshold, either from comparator A 135 or from storage medium 134, as is illustrated in FIG. 1A. Arithmetic circuit B 136 is configured to obtain a dynamically defined threshold having a value such that, if bins having powers exceeding that threshold are excised, it would reduce the collective power to or below the predetermined threshold. Arithmetic circuit B 136 is coupled to comparator B 137, e.g., via an appropriate conductive element. Comparator B 137 receives the spectral bins, as well as the dynamically defined threshold from arithmetic circuit B 136. Comparator B 137 is configured to set to excise, e.g., set to zero, any spectral bins that exceed the dynamically defined threshold.

Note that arithmetic circuits A and B 133, 136, comparators A and B 135, 137, and storage medium 134 may be implemented using any suitable logic circuits known in the art. For example, arithmetic circuits are known in the art and are commercially available, as are comparators and storage media, and suitably may be coupled together with conductive elements. In other embodiments, the functionalities of one or more of arithmetic circuits A and B 133, 136, comparators A and B 135, 137, and/or storage medium 134 may be provided by a suitably programmed field-programmable gate array (FPGA) or application-specific integrated circuit (ASIC). FPGAs and ASICs are commercially available, and methods of programming same to achieve desired logical programming are known in the art. In still other embodiments, the functionalities of one or more of arithmetic circuits A and B 133, 136, comparators A and B 135, 137, and storage medium 134 may be provided by a suitably programmed computer, e.g., a personal computer. Additionally, note that circuitry other than arithmetic circuits A and B 133, 136, comparators A and B 135, 137, and storage medium 134 may be used to provide power analysis circuit 130 with functionality analogous to that described herein.

Inverse FFT (iFFT) circuit 140 is configured to receive the spectral bins output by power analysis circuit 130 (e.g., by comparator B 137) via iFFT circuit input port 141 and conductive element 142. iFFT circuit 140, which may include any suitable commercially available circuitry, then performs an inverse function to that of FFT circuit 120, that is, to determine the time components of a signal that varies in frequency, and as such to provide as output a signal that resembles the combination of the desired group of signals plus interference initially received by antenna 11, but less the interference in any bin whose power was excised by power analysis circuit 130, e.g., whose power was set to zero. iFFT circuit 140 provides such output to demodulator(s) 12 via amplifier input port 151 and conductive element 152. Because interference reduction system 100 reduces the amount of interference that amplifier receives, demodulator(s) 12 are more likely to operate within their linear range(s), and thus less likely to distort the desired group of signals. As such, receiver 10 may more readily distinguish, and obtain information from, the different multiplexed signal components of the desired group of signals from one another than may otherwise be possible without the interference reduction.

Figure 1B:
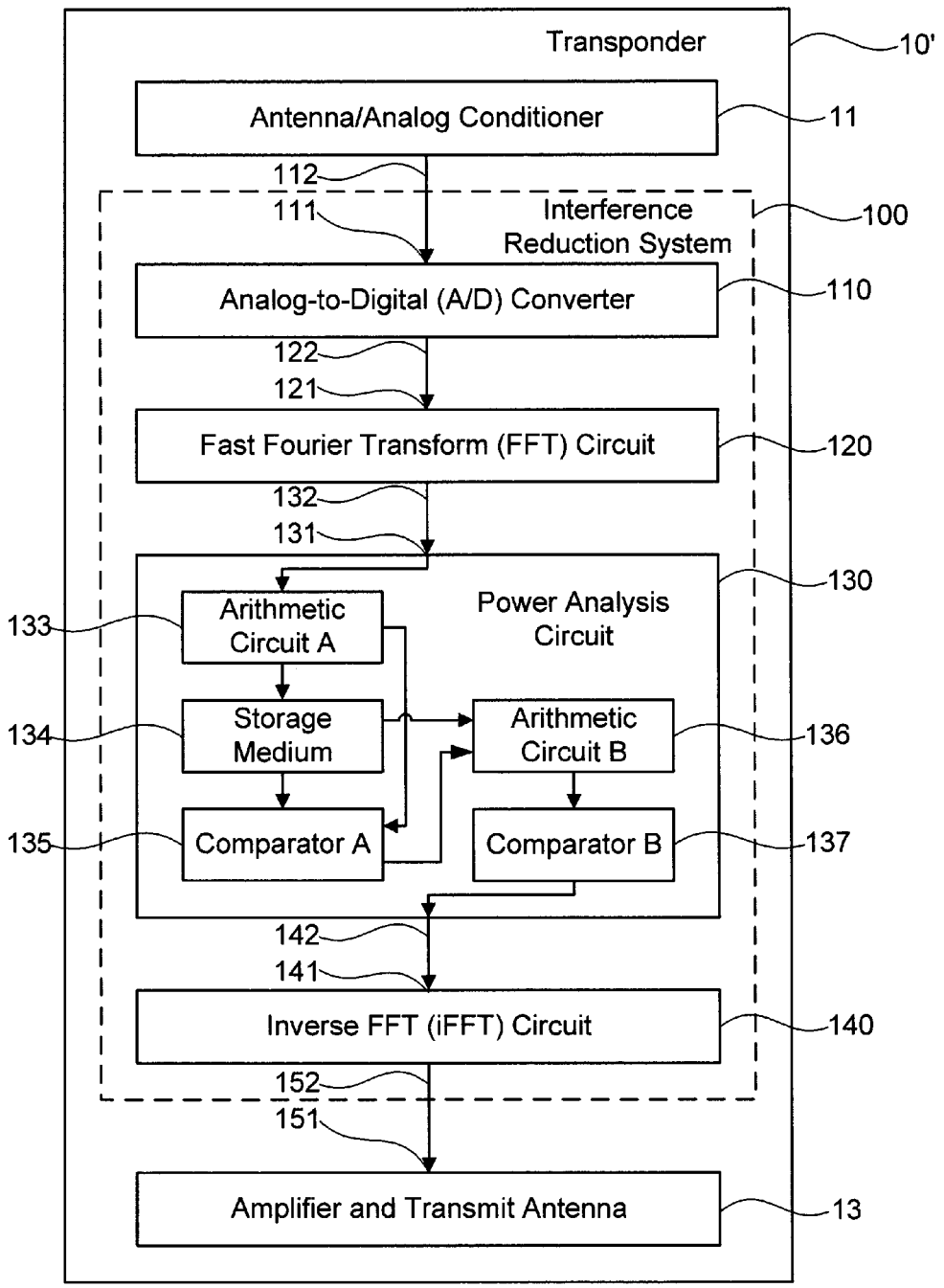
FIG. 1B illustrates a system for reducing interference in a transponder, according to some embodiments of the present invention.

In an alternative embodiment, transponder 10' illustrated in FIG. 1B is configured similarly to receiver 10 illustrated in FIG. 1A, but is configured to transmit the inversely Fourier transformed signals to a remote user for remote demodulation, rather than locally demodulating the signals. In transponder 10', iFFT circuit 140 is configured to provide its output to amplifier and transmit antenna(s) 13, e.g. via amplifier input port 151 and conductive element 152. Amplifier and transmit antenna(s) 13 then amplify and transmit the received signal to one or more individual user(s), each of whom has their own demodulator(s) 12. In such embodiments, the predetermined threshold used by power analysis circuit 130 is based on the linear range of operation of amplifier and transmit antenna(s) 13. For example, if the amplifier and transmit antenna(s) 13 are limited to a total power of 50 Watts or less to achieve linearity, then the predefined threshold may be established to limit the signal power output from iFFT circuit 140 to amplifier and transmit antenna(s) 13 to 50 Watts.

The operation of system 100 illustrated in FIGS. 1A-1B now will be described in greater detail with reference to method 200 illustrated in FIG. 2 and exemplary signals illustrated in FIGS. 3A-4D. Method 200 includes digitizing a group of signals and interference received from an antenna and analog conditioning circuitry of a receiver (step 210). For example, as described above with reference to FIG. 1A, A/D converter 110 may receive and digitize signals from antenna/analog conditioner 11. Such signals may include the desired group of signals and any interference that occurs within the same bandwidth as does the group of signals. For example, as illustrated in FIG. 3A, exemplary code division multiple access (CDMA) signal 301 received by antenna/analog conditioner 11, sampled at a given period of time, and provided to A/D converter 110 may include several different portions a-f having power levels that vary over time. In the example of FIG. 3A, signal 301 may include portions a-d and f having a relatively low power level, as well as portion e having a higher power level. Portions a-d and f contain a desired group of signals and perhaps low level interference components. The relatively small variation in their relative power levels may result from users accessing and leaving the system, and perhaps some variation in low level interference, which typically persists a prolonged period of time in the normal course of system operation. However, signal 301 also includes portion e which includes high level interference added to the desired group of signals and perhaps some low level interference as well.

As noted above, during step 210 of FIG. 2, A/D converter 110 digitizes the received signals into quantized levels forming a digital data stream, which include the desired group of signals and interference. Following transforming the received signal collection into the digital domain, an FFT is performed (step 220) that transforms the received signal collection at a given instant of time into frequency bins spanning the spectrum of the signal at that instant. In one illustrative embodiment, received signal 301 has a bandwidth of approximately 10 MHz, and is mapped by FFT circuit 120 onto 64 bins, in which case the frequency resolution (the width of each bin) is about 156 kHz.

Figure 3A:
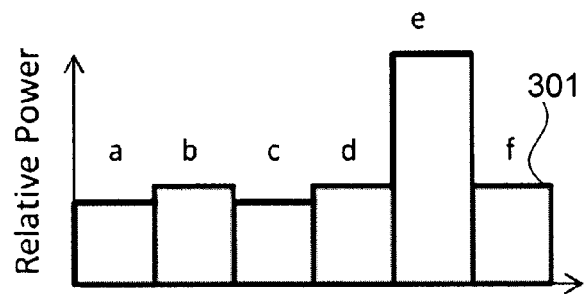
FIG. 3A illustrates an exemplary group of code division multiple access (CDMA) signals and interference that may be received by the antenna/analog conditioner of a receiver.
Figure 3B:
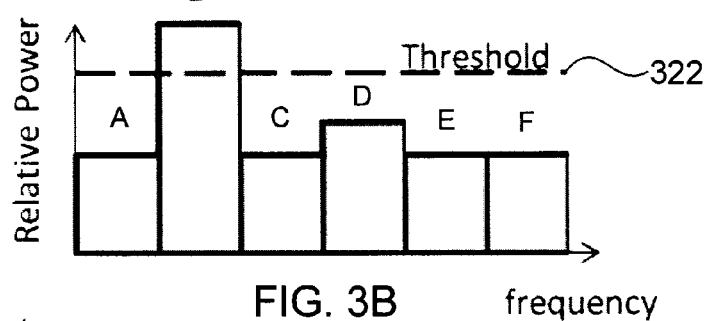
FIG. 3B illustrates an exemplary set of spectral bins following digitization and Fourier transformation of the group of signals and interference of FIG. 3A at an instant of time during portion e illustrated in FIG. 3A.

In one illustrative example, if the instant of time when the FFT is performed lies within the portion e in FIG. 3A, e.g., when strong interference is present, a distribution of the power levels in the frequency bins in FIG. 3B may be obtained. The actual signals in the FFT bins are contained in a digital data stream and the illustration in FIG. 3B indicates the power levels in those bins at a given instant of time. If the input signal collection consisted exclusively CDMA signals, the power levels in the FFT bins would be relatively constant. However, the distribution of power levels in the frequency bins illustrated in FIG. 3B contains two bins, B and D, that contain higher power levels than the remaining bins A, C, E, and F. These bins with the discernably higher power levels contain not only the spectral components of the desired CDMA signal collection but also the spectral components of two interfering signals. The illustration in FIG. 3B also includes the dynamically predefined threshold level 322 established by the power analysis circuit 130 as described further below. In FIG. 3B, the power level of bin B exceeds threshold 322, while the power level of bin D does not.

Figure 2:
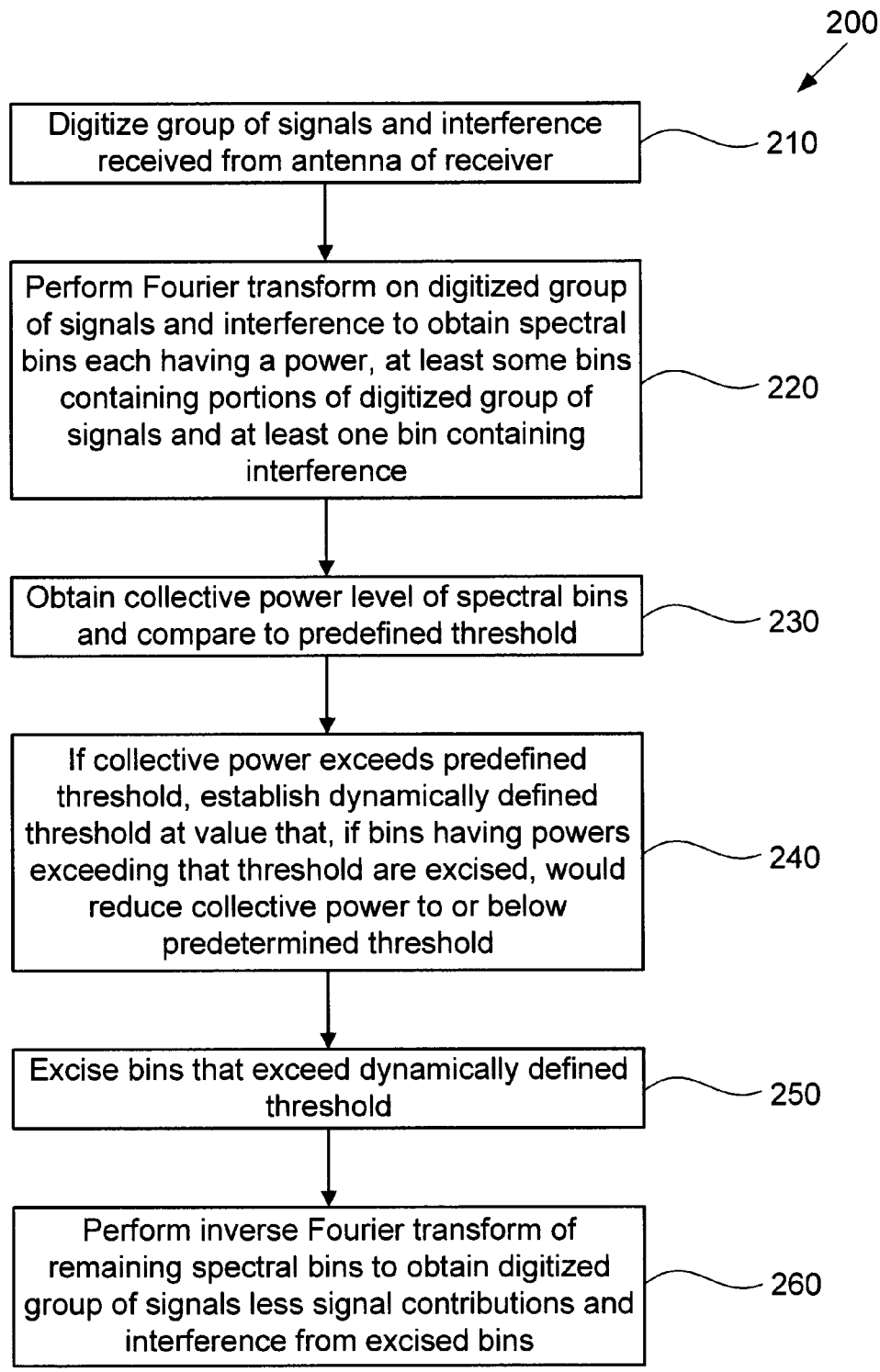
FIG. 2 illustrates a method of reducing interference in a receiver, according to some embodiments of the present invention.

Method 200 of FIG. 2 also includes obtaining the collective power of the spectral bins, and comparing the collective power level of those bins to a predefined threshold (step 230). For example, power analysis circuit 130 described above with reference to FIG. 1A may receive the spectral bins from FFT circuit 120, and may include circuitry such as arithmetic circuit A 133, storage medium 134, and comparator A 135 that together are configured to obtain the collective power of the received spectral bins, and to compare the collective power level of those bins to a predefined threshold so as to assess whether the desired group of signals and the interference together may have a power that exceeds the linear range of demodulator(s) 12. For the exemplary signal illustrated in FIG. 3B, arithmetic circuit A 133 may obtain a sum of the power levels in bins A-F, storage medium 134 may store a value representative of the maximum power level at which demodulator(s) 12 may demodulate the signal(s) with adequate linearity, and comparator A 135 may be configured to compare the sum from arithmetic circuit A 133 to the value from storage medium 134.

Method 200 of FIG. 2 also includes, if the collective power of the spectral bins exceeds the predetermined threshold, establishing a dynamically defined threshold (step 240). Preferably, the dynamically defined threshold has a value that, if the bins having powers exceeding that threshold are excised, the collective power would be reduced to or below the predetermined threshold. For example, as noted above with reference to FIG. 1A, power analysis circuit 130 may include arithmetic circuit B 136 that is configured to establish the dynamically defined threshold in such a manner. For the exemplary spectral bins illustrated in FIG. 3B, bin B has a power level that exceeds dynamically defined threshold 322, while the power level of bin D is less than threshold 322.

Figure 3C:
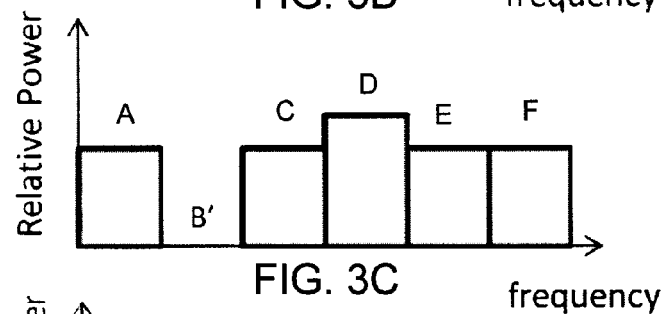
FIG. 3C illustrates the exemplary set of spectral bins of FIG. 3B following excision of bins containing interference.

Method 200 of FIG. 2 also includes excising any bins that exceed the dynamically defined threshold (step 250), such as by setting the power level of such bins to zero. For example, power analysis circuit 130 illustrated in FIG. 1A may include comparator B 137 configured to compare the power level of each spectral bin to the dynamically defined threshold, and to reduced to zero the power level of any spectral bin that exceeds the dynamically defined threshold. Referring to FIG. 3C, it may be seen that the power level of spectral bin B which exceeded dynamically defined threshold 322 in FIG. 3B has been set to zero, thus excising that bin and resulting in modified bin B'. However, although the power level of spectral bin D exceeds that of the remaining bins, bin D in FIG. 3B has not been excised because its power does not exceed dynamically defined threshold 322. The signals at this time instant are contained in a digital data stream that differs from the digital data stream after the A/D 110 by excluding the spectral distribution of the high level interference in frequency bin B' but containing the spectral distribution of the interference below the threshold in frequency bin D. The power levels after excision in FIG. 3C represent the spectral components in the data stream after excision. It should be noted that bin D may contain usable signal information, because the power level of the interference is not significantly greater than that of the desired signal component to which it is added. In this case, the CDMA processing gain mitigates the lower level interference as is known in the art. Preferably, following the excision of any bins that exceed the dynamically defined threshold, the collective power of the remaining bins is at or below the predetermined threshold, that is, is within the linear range of operation of demodulator(s) 12.

Method 200 of FIG. 2 further includes performing an inverse Fourier transform on the remaining spectral bins, so as to obtain a digitized group of signals less any signal contributions and interference that was in the excised bins (step 260). For example, as noted above with reference to FIG. 1A, iFFT circuit 140 may perform an iFFT on the output of power analysis circuit 130 (e.g., on the output of comparator B 137), and may provide the output of such iFFT to demodulator(s) 12. The iFFT output includes a digital data stream containing the information describing the wide bandwidth CDMA spectrum illustrated in FIG. 3D at a given instant of time occurring during portion e illustrated in FIG. 1A. The resulting spectrum after iFFT operations is again a digital data stream that at a given instant of time may have the power spectral distribution illustrated in FIG. 3D during the instant of time these operations were performed within the time interval e in FIG. 3A. Each frequency bin after iFFT operations may follow the time domain signal variation during subsequent time periods.

Figure 3D:
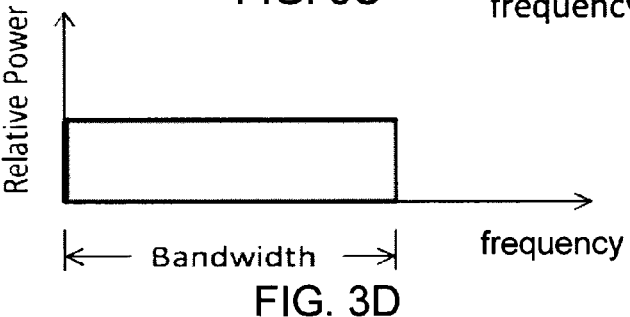
FIG. 3D illustrates the instantaneous power spectral distribution during the instant of time during portion e illustrated in FIG. 3A.

Note that the spectrum after excision in FIG. 3D has reduced desired CDMA signal power that results from the excision. This signal loss is small as the high level interference power has a narrow bandwidth that occupies a small fraction of the frequency bins. Wide bandwidth high level interference occupies a larger number of frequency bins that results in more desired CDMA signal power loss. The tolerable amount of signal loss depends on the link margin and amount of signal energy needed for acceptable signal performance. However, excising high level signal components that result in nonlinear receiver operation is required to avoid the additional degradation to communication performance. When linear receiver operation is maintained, the loss in communication performance is limited to desired signal loss resulting from excision. In addition, the spectral components of the interference whose levels do not exceed the excision threshold are also present. The processing gain of the CDMA waveform inherently provides interference protection from low level interference. These issues are known in the art.

Figure 3E:
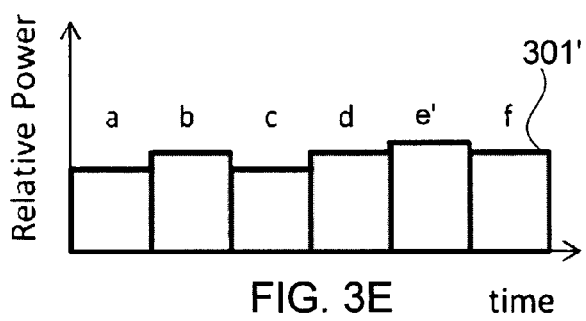
FIG. 3E illustrates an exemplary group of CDMA signals, less interference in the bins whose power the power analysis circuit set to zero as illustrated in FIG. 3C, following inverse Fourier transformation.

FIG. 3E illustrates exemplary CDMA signal 301' following digitization, excision, and inverse Fourier transformation of signal 301. As compared to signal 301, it may be seen that each portion a-e of signal 301' has a relatively low power level. The relatively small variation in their relative power levels may result from users accessing and leaving the system, and perhaps some variation in low level interference, which typically persists a prolonged period of time in the normal course of system operation. Portion e', which in signal 301 included high level interference added to the desired group of signals and perhaps some low level interference as well, has now been reduced to a power level similar to that of other portions a-d and f of signal 301'.

Following steps 210-260 illustrated in FIG. 2, the resulting signals then may be distinguished from one another, e.g., demultiplexed and decoded using a priori knowledge of the CDMA codes initially used to multiplex the signals with one another. Receiver 10's power requirements for performing such processing may be significantly reduced relative to those for processing otherwise similar signals from which interference had not been excised particularly in the case where interference excision is applied to transponder architectures where the transponder's transmitter level must be increased to maintain a linear output.

Note that excising a given bin during step 250 of method 200 illustrated in FIG. 2 not only removes any interference within that bin, but also any spectral components of the desired group of signals within that bin. However, for CDMA-based signals, such excision of desired signal components may have little impact on the receiver's ability later to demultiplex and decode the signal components in the remaining bins. Specifically, as mentioned above and as known in the art, CDMA spreads each signal of the group over the same selected portion of the spectrum as the other signals in the group. As such, excising a subset of that selected portion of the spectrum (the subset being within the excised bin) reduces the overall signal strength of all of the signals in the group, but substantially without reducing the information content of the signals in the group. For example, even if 20% of the selected portion of the selected portion of the spectrum is excised, the overall power of the desired group of signals may be reduced by approximately 1 dB, which may not significantly impact the receiver's ability to demultiplex and decode the signal components in the remaining bins. However, if the excised interference has sufficiently large bandwidth relative to that of the desired group of signals, then the overall power of the desired group of signals may be reduced to an extent that may make it difficult to demultiplex and decode the signal components in the remaining bins thus degrading communication performance. Thus, the interference preferably has a relatively narrow bandwidth relative to the desired group of signals.

Additionally, note that CDMA is only one example of a technique that may be used to multiplex a group of signals with one another in a "broad bandwidth" manner, from which interference may be excised using system 100 illustrated in FIGS. 1A-1B and method 200 illustrated in FIG. 2. Another such technique is FDMA, which as mentioned above assigns different signals in the group to different portions of the spectrum than one another. FIGS. 4A-4D illustrate exemplary signals that may be generated using system 100 illustrated in FIGS. 1A-1B and method 200 illustrated in FIG. 2 to excise interference from an FDMA signal.

Figure 4A:
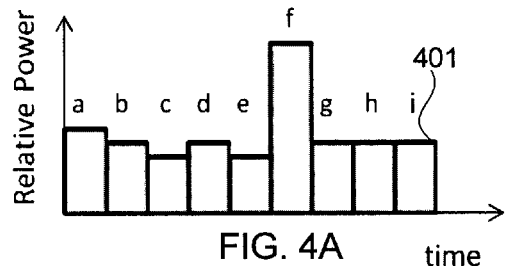
FIG. 4A illustrates an exemplary group of code division multiple access (FDMA) signals and interference that may be received by the antenna/analog conditioner of a receiver, prior to digitization.

Specifically, FIG. 4A illustrates exemplary FDMA signal 401 which may be received by antenna 11 and provided to A/D converter 110 as illustrated in FIG. 1A (step 210 of method 200 illustrated in FIG. 2). FDMA signal 401 may include several different portions a-i that vary relative to one another over time and differ from one another, depending on the particular power level for each signal within the frequency bins Signal 401 also may include interference, as denoted by higher power level portion f.

Figure 4B:
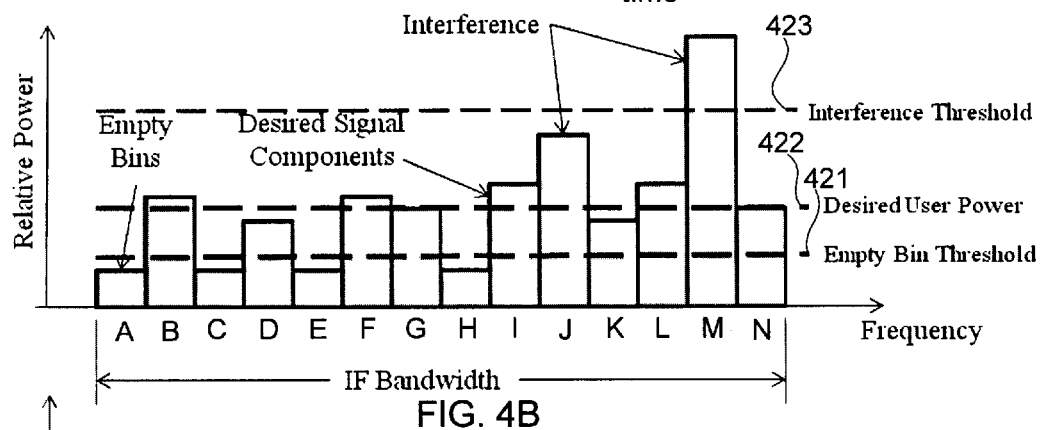
FIG. 4B illustrates an exemplary set of spectral bins following digitization Fourier transformation of the group of signals and interference of FIG. 4A at an instant of time during portion illustrated in FIG. 4A.
Figure 4C:
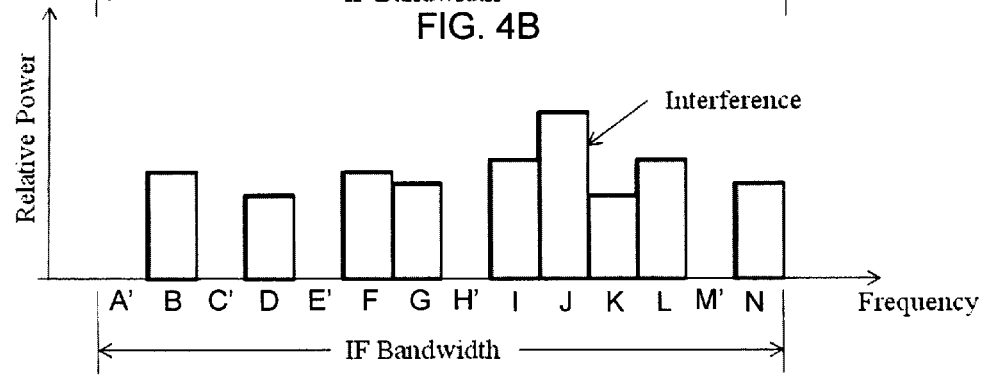
FIG. 4C illustrates the exemplary set of spectral bins of FIG. 4B following excision of bins containing interference.

FIG. 4B illustrates an exemplary distribution of power levels in frequency bins following digitization and Fourier transformation of signal 401 (step 220 of method 200 illustrated in FIG. 2) at an instant during portion illustrated in FIG. 4A. The output of Fourier transformation of FDMA signal 401 includes a digital stream having a plurality of spectral bins A-N to which different spectral components of signal 401 may be mapped by FFT circuit 120 during step 220 of FIG. 2. As may be seen in FIG. 4B, the power levels in each bin corresponding to the portions of the digital data stream containing the spectral information of that bin's content, the power levels in the various spectral bins may vary relative to one another, with spectral bins J and M having particularly high power levels relative to the others, and thus possibly containing interference. The collective power of the spectral bins then may be obtained and compared to predefined threshold, e.g., by implementing step 230 illustrated in FIG. 2 using arithmetic circuit A 133, storage medium 134, and comparator A 135 described above with reference to FIG. 1A. If the collective power of the spectral bins exceeds the predetermined threshold, then dynamically defined threshold 423 may be established, as described above with reference to step 240 of FIG. 2 and arithmetic circuit B 136 described above with reference to FIG. 1A. For the exemplary spectral bins illustrated in FIG. 4B, only bin M has a power level that exceeds dynamically defined threshold 423. FIG. 4C illustrates the spectral bins following excision of bin M in a manner analogous to that described above with reference to step 250 of FIG. 2 as implemented using comparator B 137 described above with reference to FIG. 1A, resulting in modified bin M'. In this regard, it should be noted that bin J may contain usable signal information, because the power level of the interference therein is not significantly greater than that of the desired signal components to which it is added.

In addition, some of the frequency bins may be unpopulated with signal components and be occupied by only noise components that have no communication value. The example in FIG. 4B contains desired FDMA signal components in bins B, D, F, G, I, K, L, and N, and may or may not have desired signal components in bins J and M that are masked by interference. Bins A, C, E, and H illustrated in FIG. 4B contain noise components but substantially no desired FDMA signal components, and thus are denoted as empty bins. The distribution of signal components is illustrated for a given instant of time and varies with operation.

FDMA-based systems may provide communications to a number of users through a transponder architecture and the illustration in FIG. 4B depicts the distribution within the transponder's IF (intermediate frequency) bandwidth. Individual users may receive the entire signal collection communicated by the transponder and select the pre-assigned frequency slot(s) to receive the communications intended for their own use. As discussed above, the transponder's transmitter preferably remains linear, and if high level interference is not excised, the transmitter power output may be increased to remain linear for the highest anticipated interference level, thus incurring a significant increase in power consumption. In cases where interference protection is desired, frequency hopped spread spectrum techniques may be used where the carrier frequency is hopped in a pseudo random pattern known to the transponder's transmitter and system users but not to the interference source. In such cases, the interference source may dilute its resources by distributing the interference over the wider spread spectrum bandwidth or cover a limited portion of that bandwidth and interfere with user communications only part of the time. The distribution in the frequency bins illustrated in FIG. 4B again pertains for an instant of time and preferably covers the hop bandwidth and interference at other times may be outside the hop bandwidth, because the pseudo-random hopping sequence is unknown to the interference source. The degradation to system users when the interference coincides with the hopped bandwidth may be mitigated by error correction coding and interleaving as is known in the art.

As described further above with reference to FIGS. 1A-1B and 2, power analysis circuitry 130 may obtain the collective power of the spectral bins, compare that power level to a predefined threshold, and, if the collective power exceeds that predefined threshold, dynamically establishe an interference threshold to determine potential frequency bins having sufficient power to result in nonlinear operation (steps 230-250). Thus in the illustrative example in FIG. 4B, frequency bin M containing strong interference, e.g., having a power level greater than dynamically defined threshold 423, would be excised, while frequency bin J having a power level less than the dynamically defined threshold 423 would not be excised. As in FIG. 3B, the spectral information in the signal collection illustrated in FIG. 4B is a digital bit stream, and the power levels in the frequency bins is used for illustration purposes.

Optionally, additional benefits may be obtained by excising certain spectral bins in addition to those that exceed dynamically defined threshold 423. For example, turning back to FIG. 4B, it may be seen that the power levels of bins B, D, F, G, and I-N are greater than empty bin threshold 421, which designates a power level below which a bin may be considered to carry insufficient information to distinguish, and thus is "empty". Empty bin threshold 421 may be defined, for example, based on a priori knowledge about the system noise level and the variance of its value. That is, each of bins B, D, F, G, and I-N has sufficient power as to permit communications (noting, of course, that bin M also includes high-power interference). By comparison, bins A, C, E, and H have power levels that are below empty bin threshold 421, and may be excised by setting their values to zero, such as illustrated in FIG. 4C, resulting in modified bins A', C', E', and H'. After excision of the high level interference and empty bins that have no communication value, the overall quantization level of the desired group of signals may be reduced allowing communication of the useful information content thereof.

Thus, method 200 illustrated in FIG. 2 optionally includes steps of comparing the power levels of the spectral bins to an empty bin threshold and excising any bins having power levels that are lower than that threshold. Such steps may be executed, e.g., using a comparator to compare the bins' power levels to a threshold stored in a suitable storage medium and to excise any bins having power levels that are lower than that threshold. Such comparator and storage medium may be included in system 100 illustrated in FIG. 1, e.g., by providing dedicated circuitry configured to provide the above-described functionality, or by providing a suitably programmed FPGA, ASIC, or computer, such as described above with reference to FIGS. 1A-1B.

FIG. 4B also depicts another threshold level for desired user signal power. FDMA systems communicate the signals of multiple users that are routed to the transponder's transmitter. This transmitter has a fixed output power so that the transmitted signal level is desired to be maintained in its linear operating range. If a user or group of users raise their power levels, the resulting transmitter power may exceed the linear operating range of the transmitter, causing the communication performance to all users to degrade. Embodiments of the present invention may be used to implement user power control to limit user power levels so that all users have an equable portion of the transmitter's power and are not degraded by nonlinear transmitter operation. Specifically, the distribution of user power levels may be obtained based on the power levels in the frequency bins, and thus the digital circuitry used in interference excision advantageously provides a means to monitor the effectiveness of user power control techniques. In the example illustrated in FIG. 4B, users' signal components in frequency bins B, F, I, J, L, and M exceed the desired user power level 422 (noting that bins J and M also contain interference components, which may obscure the users' actual signal levels). Additionally, as may be seen in FIG. 4B, users' signal components in frequency bins A, C-E, H, and K have less than the desired user power level 422, and thus have potentially degraded communication performance (noting that bins A, C, E, and H otherwise may be designated as "empty" as described above). Additionally, users' signal components in frequency bins G and N have approximately the desired user power level 422. The desired user power level 422 for user power control monitoring may be established by a power analysis circuit similar to 130, and which may be used after other frequency bins are excised, e.g., after bins having high interference levels and/or empty bins are excised. In some embodiments, the desired user power level 422 may be established dynamically by summing the power levels in frequency bins that have not been excised so that the transponder's transmitter remains within its linear operating range. After user power deviations from the desired levels are determined, users can be notified to readjust their power levels. For example, bins having power levels that are lower than desired user power level 422 may be identified, and sources of the signal components within those identified bins may be notified that they may increase their power levels so as to improve performance.

Following excision of any spectral bins having power levels that exceed dynamically defined threshold 423, and optionally of any spectral bins having power levels that are less than empty bin threshold 421, as well as optionally identifying bins having power levels that are higher or lower than desired user power level 422, an inverse Fourier transform may be performed on the remaining spectral bins so as to obtain a digitized group of signals less any signal contributions and interference that was in the excised bins (step 260 of FIG. 2). An iFFT circuit 140 such as described above with reference to FIG. 1A may be employed to perform such an inverse Fourier transformation and may provide the output of such transformation to demodulator(s) 12. However, the power levels of interference portion M' and the empty bins A', C', E', and H' illustrated in FIG. 4C, which have no communication value, have been reduced significantly relative to their power levels in FIG. 4B. The overall quantization level of the remaining group of signals, including "empty" bins and remaining interference, is significantly lower than in FIG. 4B, and preferably is within the linear range of demodulator 12. As such, system 100 may process the desired group of signals and any remaining interference, which may be of a sufficiently low level as to inhibit distortion of the desired group of signals during amplification.

Figure 4D:
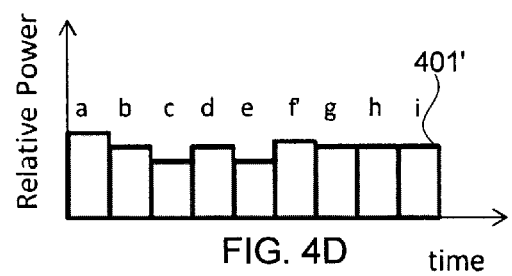
FIG. 4D illustrates an exemplary group of FDMA signals, less interference in the bins whose power the power analysis circuit set to zero as illustrated in FIG. 4C, following inverse Fourier transformation.

FIG. 4D illustrates exemplary FDMA signal 401' following digitization, excision, and inverse Fourier transformation of signal 401. As compared to signal 401, it may be seen that each portion a-i of signal 401' has a relatively low power level. Portion f', which in signal 401 included high level interference, has now been reduced to a power level similar to that of other portions a-e and g-i of signal 401'.

The signals of the group then may be distinguished from one another, e.g., demultiplexed using a priori knowledge of the spectral regions to which each of the signals has been assigned. Receiver 10's power requirements for performing such processing may be significantly reduced relative to those for processing otherwise similar signals from which interference had not been excised particularly in transponder architectures.

As compared to the CDMA example described above with reference to FIGS. 3A-3C, in which excising bins resulted in an overall reduction in CDMA signal strength but without loss of information, it should be noted that excising interference-containing bins in FDMA-based signals also may excise any desired signals assigned to spectral regions that fall within the excised bins. However, in such bins, the interference may be sufficiently strong that even without excision it may not necessarily be possible to obtain information from the desired signals, and as such the excision may not necessarily reduce the amount of information that practicably may be obtained from the group of signals. The tolerable interference level depends on the error correction coding and interleaving commonly practiced in the art.

Note that the operation of interference reduction system 100 illustrated in FIGS. 1A-1E, e.g., the implementation of method 200 illustrated in FIG. 2 to produce signals as exemplified in FIGS. 3A-3E and 4A-4D, preferably occurs in "real-time." That is, the components of system 100 preferably reduce interference with broad bandwidth signals as those signals arrive based on the relative power levels of the different spectral components of the signal, and immediately thereafter provide the resulting signals to demodulator(s) 12 for processing, as illustrated in FIG. 1A, or to transmit antenna(s) 13 for transmission to a user, as illustrated in FIG. 1B. By comparison, adaptive notch filters such as mentioned above rely on iterative spectral analysis of the interference to derive the adaptive filter's weighting coefficients, potentially resulting in time delays in adjusting to changes when the interference spectrum dynamically varies over time in an unpredictable manner.

Note that for FDMA-based signals, system 100 may be adapted to provide enhanced functionality in routing signals to various destinations, e.g., analogously to a digital channelizer. For example, communication satellites and terrestrial transponders may use multiple beams (signals) to increase link performance and communication throughput in communicating to an overall coverage area. In such designs, frequency reuse plans wherein adjacent antenna beams are assigned a subband of the overall frequency allocation and groups of FDMA users populate those subbands may be used to reduce mutual interference between adjacent beams. The investment in digital technology in system 100 together with digital routers and multiplexers advantageously provides operational flexibility to provide connectivity between users distributed over the collection of antenna beams accessing system 100 units connected to each receiving beam to their destination beams that may or may not be in beam locations where the signal originates. However, the demands for communication throughput often are not uniformly distributed over the collection of beams, and users at one beam destination may desire communication to other beam destination(s).

Figure 5:
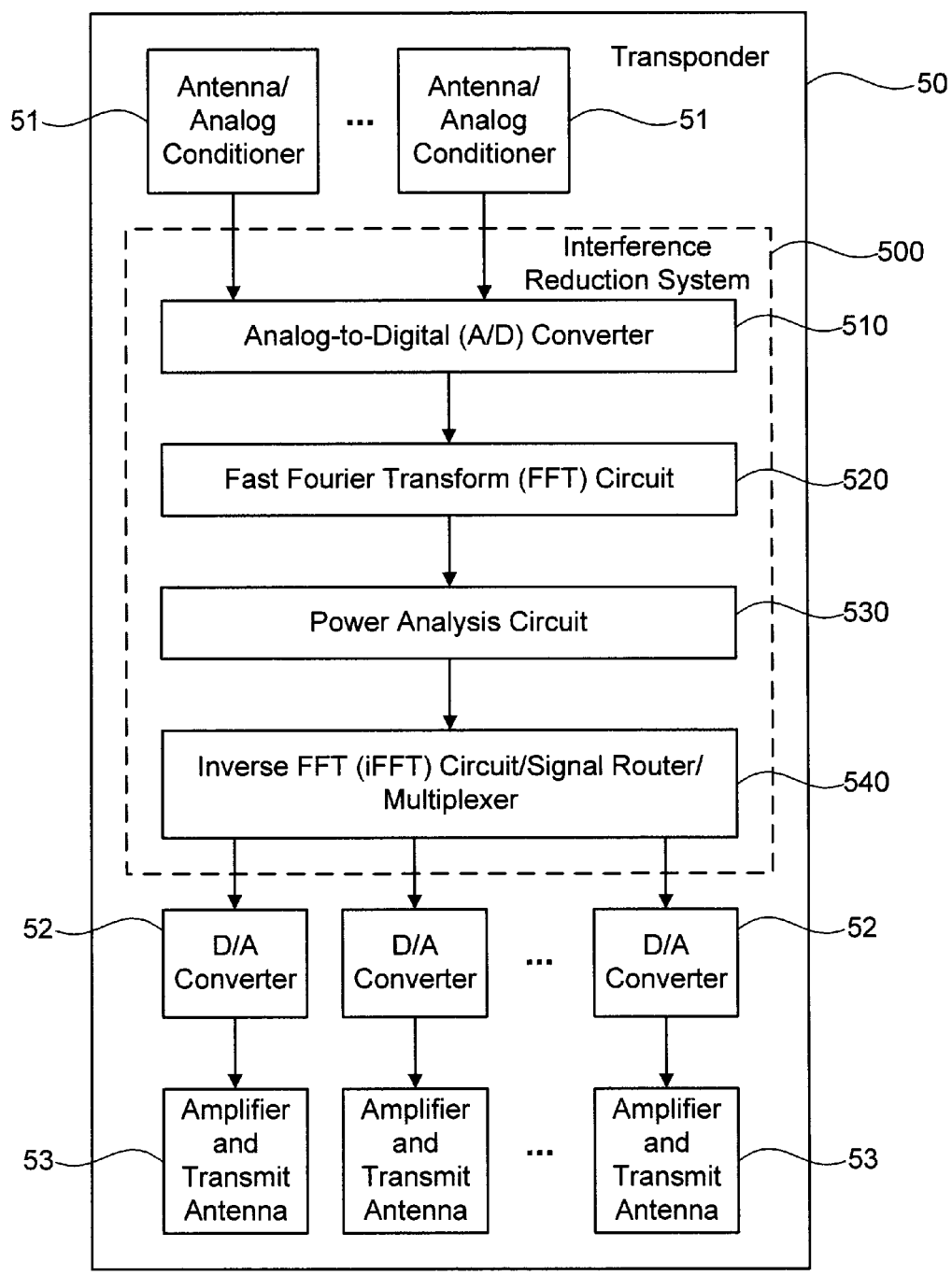
FIG. 5 illustrates an alternative transponder, according to some embodiments of the present invention.

FIG. 5 illustrates alternative transponder 50 configured to use modified system 500 to digitally demultiplex, excise interference from, multiplex, and/or route signals to multiple users. Specifically, transponder 50 illustrated in FIG. 5 receives analog conditioned signals from one of the multiple antenna/analog conditioners 51 and transforms these analog inputs to the digital domain using an A/D converter 510, preferably with M bits of quantization to ensure the analog input is not clipped and remains linear for the highest anticipated interference level. The digital stream from the A/D converter then is digitally demultiplexed using FFT circuit 520. That is, signals that may overlap temporally with one another may be demultiplexed from one another by assigning their spectral contributions to different bins than one another. Power analysis circuit 530 then may excise any high power level interference and/or empty subbands in the demultiplexed signals, thus reducing the quantization requirements to a smaller number of bits (M–N). Then, iFFT circuit/signal router/multiplexer 540 receives the demultiplexed frequency bins, less any excised bins, and routes the bins based on signal components contained therein their destination outputs, e.g., to one of digital-to-analog (D/A) converters 52 and amplifier and transmit antennas 53. Preferably, iFFT circuit/signal router/multiplexer 540 further is configured to multiplex together, as appropriate, frequency bins received by one or more other antennas/analog conditioners 51 and then inversely Fourier transforms the multiplexed signals from the spectral to the time domain. In some embodiments, iFFT circuit/signal router/multiplexer 540 includes circuitry including a network of switches configured to receive the frequency bins output by power analysis circuit 530 and to route those bins according to the intended destination of those bins. The circuitry of iFFT circuit/signal router/multiplexer 540 also may include a multiplexer circuit configured to receive the routed bins from the network of switches and to multiplex those bins with any other bins having the same intended destination. The circuitry of iFFT circuit/signal router/multiplexer 540 also may include an iFFT circuit configured to receive the multiplexed bins from the multiplexer circuit and to perform an iFFT to transform those multiplexed bins into the time domain. The resulting digital data stream, including the multiplexed outputs as appropriate, are then transformed by D/A converter 52 into the analog domain, analog conditioned using frequency upconverters to the transmitted frequency used in that beam position (circuitry not shown), and then amplified by the transmitter and routed to the antenna serving the intended destination using an appropriate amplifier and transmit antenna 53. Note that the circuitry of iFFT circuit/signal router/multiplexer 540 may be implemented, for example, using an ASIC or FPGA, or by separately providing and connecting the individual circuitry components together with one another.

Figure 6:
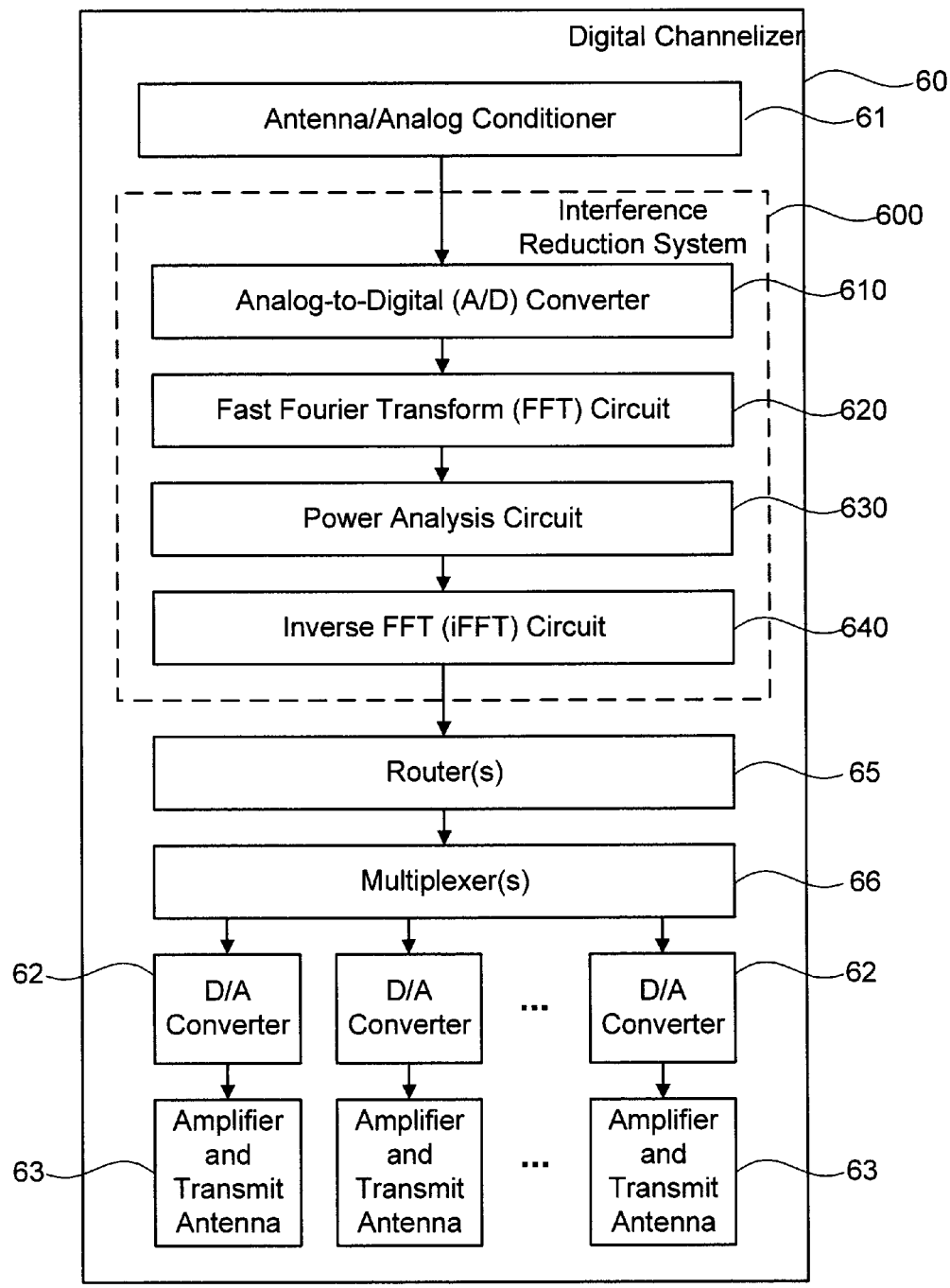
FIG. 6 illustrates a digital channelizer, according to some embodiments of the present invention.

In other embodiments, system 100 usefully may be employed in digital channelizer 60 such as illustrated in FIG. 6 so as to provide enhanced communication flexibility. Digital channelizer 60 may include receive antenna/analog conditioner 61 configured to receive a group of multiplexed signals, e.g., FDMA-based signals, as well as interference reduction system 600 configured to excise interference and "empty" bins therein using method 200 described above with reference to FIG. 2 and optional modifications thereof, e.g., A/D converter 610, FFT circuit 620, power analysis circuit 630, and iFFT circuit 640 which may be similar to those described above with reference to FIG. 1A. Analogously as noted above with reference to FIG. 5, FFT circuit 620 is configured to demultiplex the signals of the group from one another, e.g., based on the different sub-portions of the spectral region to which the signals respectively have been assigned. Digital channelizer 60 further includes one or more routers 65 that are configured to route the signals to one or more multiplexer(s) 66 based on the intended destinations of the different signals. That is, router(s) 65 group together signals that are intended for a common destination as one another, and provide those signals as a group to a corresponding multiplexer 66, which multiplexes the signals of the group together and provides the resulting group of signals to a corresponding D/A converter 62 and then to a corresponding amplifier and transmit antenna 63. In some embodiments, digital channelizer includes as many router(s) 65, multiplexer(s) 66, D/A converters 62, and amplifiers and transmit antennas 63 as there are intended signal destinations.

In some cases, signal components after interference excision from adjacent beam positions can advantageously be combined to produce an additional beam position located within the coverage of the adjacent beams, e.g., digital beamforming to provide the capability to increase antenna gain levels within the coverage area compared to the fixed beam positions. Such digital beamforming can be implemented by using a priori selected fixed beam combining coefficients, dynamically determined beam combining coefficients to track system uses, or dynamically determined coefficients to adaptively produce pattern nulls in the direction of residual interference sources as known in the art. Because high level interference sources may be excised using system 100, these digital beamforming techniques may be implemented without degradation from nonlinear receiver operation.

In other embodiments, the signals received by multiple beams may be demodulated and remodulated into a transmitted format in a processing transponder architecture. In these embodiments, the demodulator circuitry may be configured to simultaneously demodulate groups of individual FDMA signal components. The capabilities of such demodulators are not fully utilized for individual beams that are lightly populated with FDMA user signals. In such cases, multiplexing individual FDMA signals received from different antenna elements would be advantageous by utilizing the demodulators more effectively. This approach may also reduce the cost and complexity of the system by reducing the number of demodulators required. Thus, system 100 usefully may be employed to enhance transmission efficiency by facilitating combination of multiple lightly-populated groups of signals with one another prior to demodulation, remodulation, and transmission.

Figure 7A:
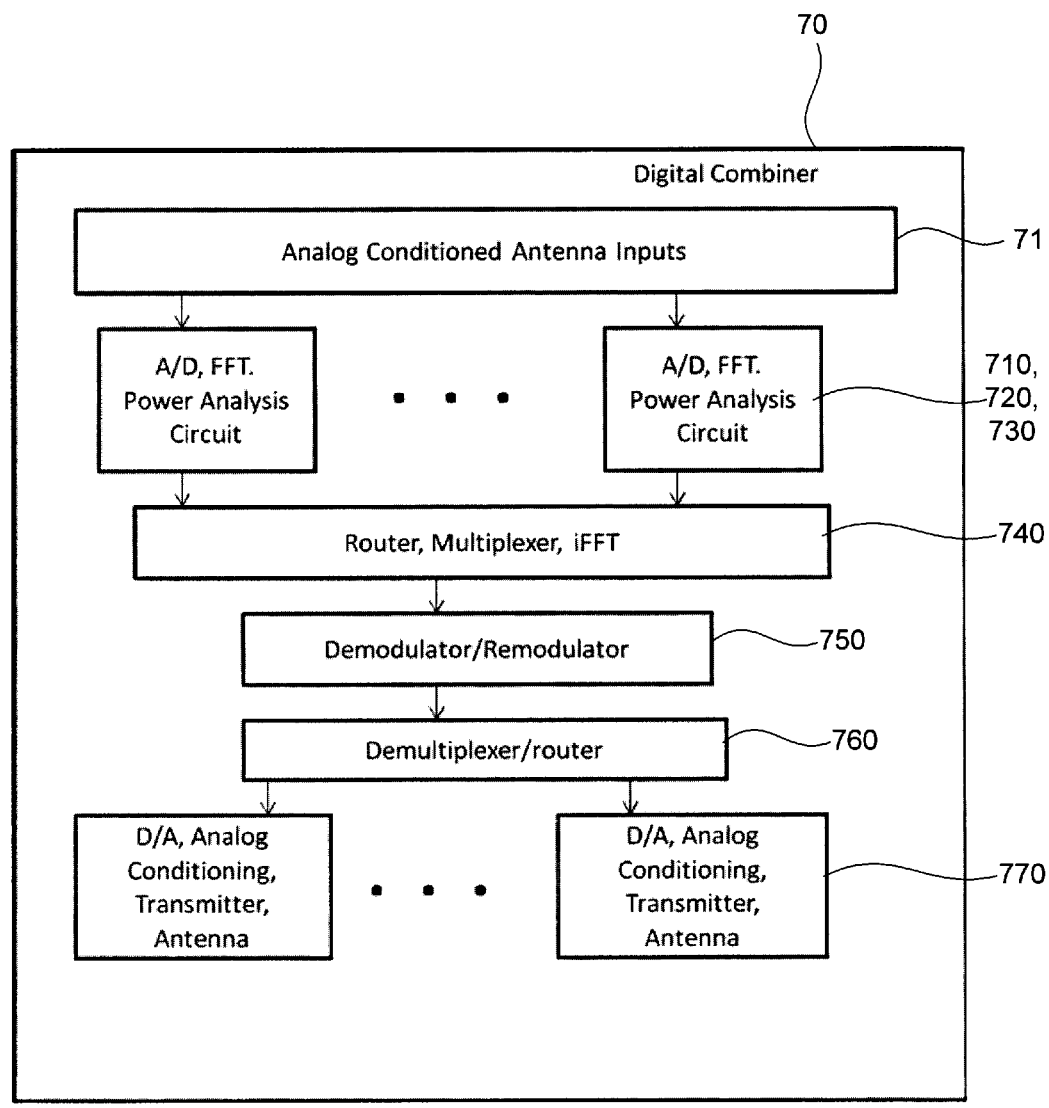
FIG. 7A illustrates a digital combiner, according to some embodiments of the present invention.
Figure 7B:
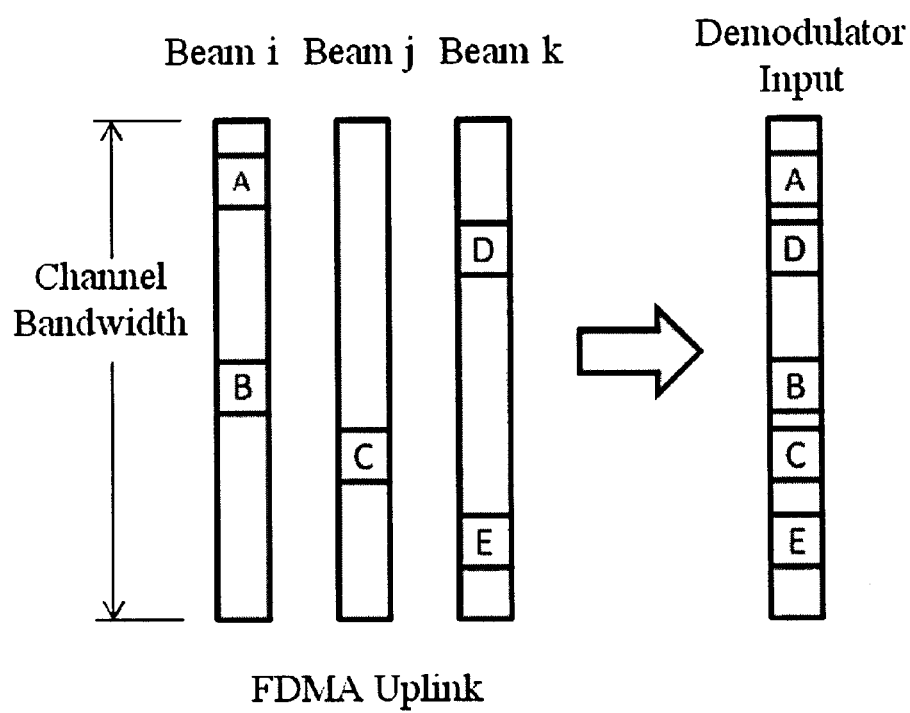
FIG. 7B illustrates signals that may be combined using the digital combiner of FIG. 7A.
Figure 8A:
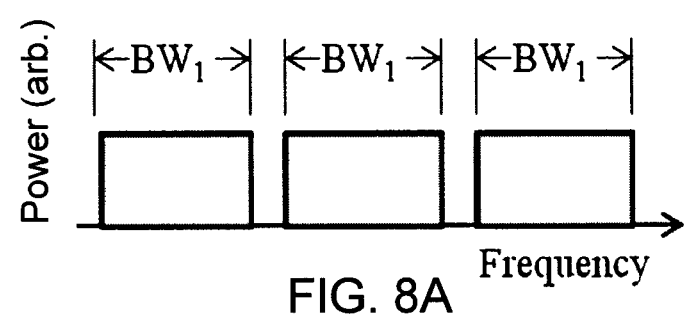
FIGS. 8A-8B illustrate exemplary groups of signals having variable bandwidths.
Figure 8B:
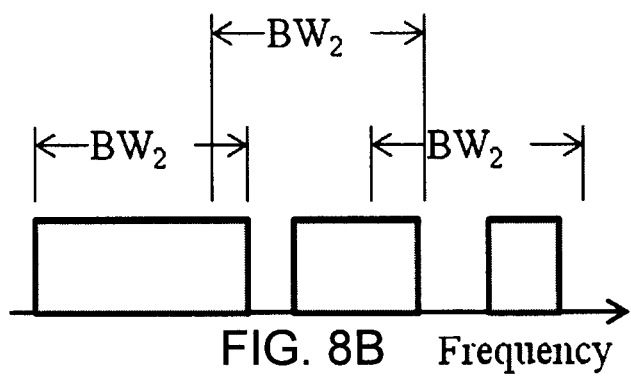

For example, FIG. 7A illustrates digital combiner 70 for FDMA signals that may include analog conditioned antenna inputs 71 configured to receive signals from one or more receive antenna(s) (not illustrated) respectively configured to receive groups of signals from different destinations. Digital combiner 70 also includes A/D converter 710, FFT circuit 720, and power analysis circui 730 (which may be the same as described above with reference to FIG. 1A), which may be configured to excise empty bins and interference and to demultiplex signals in the manner described above. Digital combiner 70 also includes a router/multiplexer/iFFT circuit 740 configured to select individual frequency bins from the collection of demultiplexed antenna outputs, multiplex then into a signal data stream, and process them with an iFFT to form a single digital input data stream that is provided to demodulator/remodulator 750. After remodulation, the remodulated data stream in its converted modulation format can be demultiplexed into separated signal components and routed by demultiplexer/router 760 to destination antennas 770 for transmissions. The remodulated data stream signals at each transmitting antenna 770 are processed by a D/A converter, analog conditioned into the transmitted frequency, amplified by the transmitter, and radiated by the antenna. In operation, the individual signal components in the received antenna signals may be assigned to different non-conflicting frequency slots by a resource allocator to avoid mutual interference. The assignments of the frequency slots illustrated in FIG. 7B provides an illustrative example for three beams i, j, and k where five frequency slots distributed among the three beams are multiplexed into a single data stream without conflicting with one another. Additionally, embodiments of system 100 and method 200 described above suitably may be modified to provide adaptive transmission bandwidth. Previously known system designs are configured to uniformly assign fixed bandwidth subbands to individual beam positions as illustrated in FIG. 8A Specifically, the spectral subregions to which different signals of a group are assigned typically is fixed based on the overall bandwidth available for the group of signals, e.g., each signal may be assigned to a sub-region of fixed width, regardless of the throughput requirements of the signal. In situation where individual signals may have varying needs for communication throughput, it may be desirable to provide greater bandwidth to signals having heavy demands for throughput, and less bandwidth to signals with lesser demands for throughput. The bandwidth in this case may be established by the bandwidth of the multiplexed signal components. For example, transponder 50 illustrated in FIG. 5, digital channelizer 60 illustrated in FIG. 6, and digital combiner 70 illustrated in FIG. 7A suitably may be configured to assign different signals to spectral sub-portions having widths that vary relative to one another based on the throughput requirements of the respective signals as illustrated in FIG. 8B. Such a configuration may provide enhanced operational flexibility to vary the transmission bandwidth in accordance with the time varying throughput demands of the individual signals.

EXAMPLE

Figure 9A:
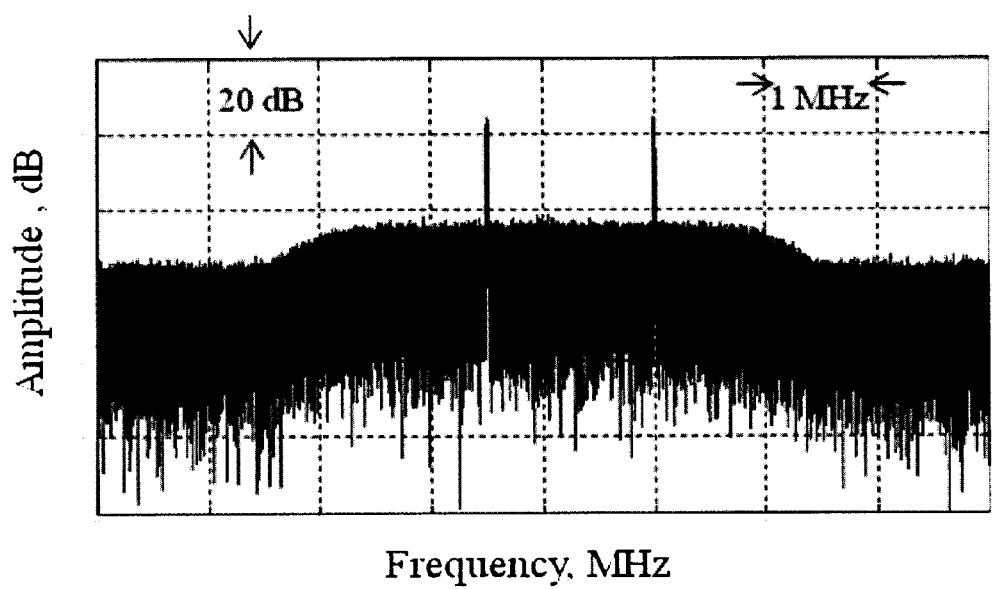
FIG. 9A illustrates a simulated CDMA signal with narrow bandwidth interference at two locations.
Figure 9B:
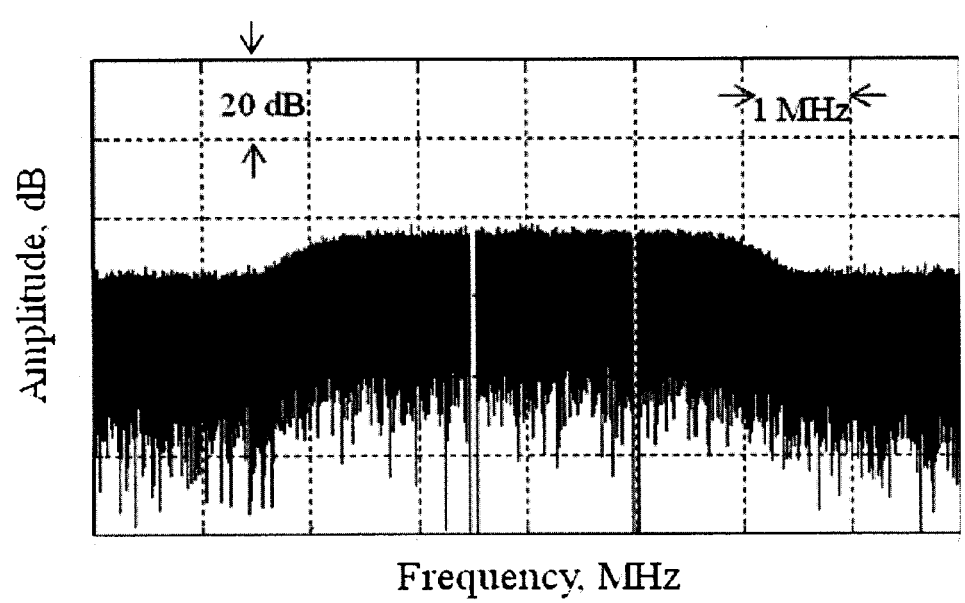
FIG. 9B illustrates the simulated CDMA signal of FIG. 9A following excision of the narrow bandwidth interference.

Potential performance characteristics of system 100 were characterized by measuring a CDMA signal having interference, excising that interference, and determining the bit error rate (BER) of the signal before and after the interference was excised, as well as for a comparable signal having no interference. Specifically, FIG. 9A illustrates a measured wideband-CDMA signal centered at 0 MHz and having a relative amplitude of approximately 15 dB between about −2.5 MHz and +2.5 MHz and a noise level with a relative amplitude of 5 dB. This spectral plot was obtained by transforming the digital data stream with a D/A converter to obtain the analog spectral distribution. Dividing this spectral distribution into frequency bins and obtaining the power in each bin would result in the spectral plots analogous to the exemplary plots in FIGS. 3B and 4B. Interference in the form of two components each having a bandwidth of 25 kHz and an spectral power density approximately 30 dB higher in the 25 KHz bandwidth was added to the CDMA signal at spectral locations of about −0.5 MHz and +1.0 MHz. FIG. 9B illustrates a second measured signal spectrum again obtained by processing the measured digital data stream with a D/A converter to obtain the analog spectral plot that included the CDMA signal after the interference was excised by setting the signal amplitude to zero in regions that previously contained the interference. A third signal (not illustrated) was simulated that was analogous to the CDMA signal illustrated in FIG. 9A but lacked interference. Each of the three types of signals were measured for different values of energy per chip/noise spectral density (Ec/No) to obtain bit error rate and block error rate values to evaluate the effectiveness of excising the two interfering tone interferers.

Figure 10:
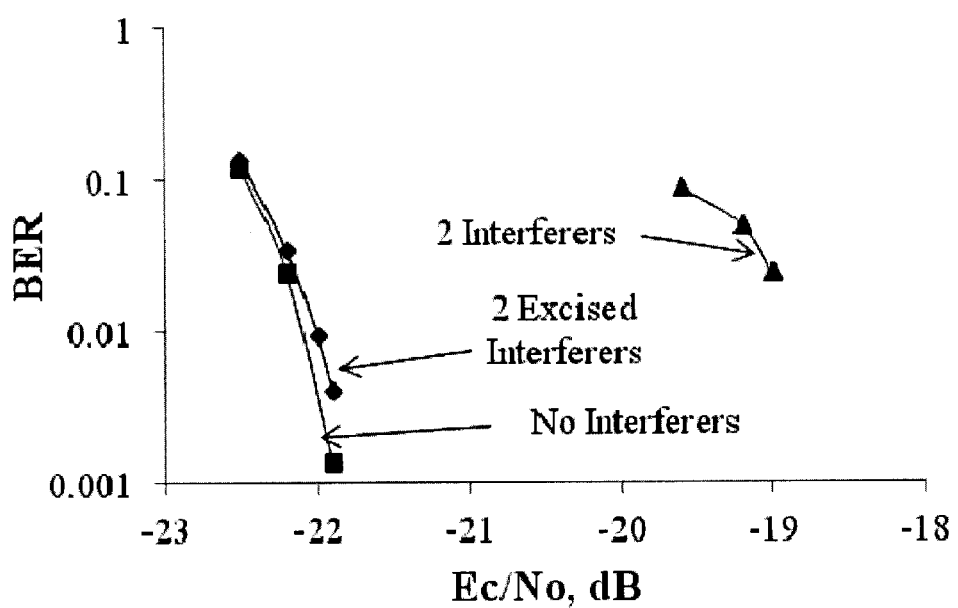
FIG. 10 illustrates the bit error rate (BER) for the signals of FIGS. 9A and 9B.

The bit error rate (BER) of the three types of simulated signals for the different values of energy per chip/noise spectral density (Ec/No) is illustrated in FIG. 10. As is known in the art, BER is reflective of the proportion of incorrect bits in a signal; a BER of $10^{-3}$ means that one bit in a thousand is incorrect. It may be seen that the CDMA signal without interference (closed squares) had the lowest BER at a given Ec/No, but that the CDMA signal with interference excised (closed diamonds) had a BER that was not significantly higher than that of the CDMA signal without interference. By comparison, the CDMA signal with interference present had a significantly higher BER than either of the other two signals that lacked interference, having a BER of 0.1 at an Ec/No of about −20 dB, while the other two signals had a BER of 0.1 at an Ec/No of about −22 dB. Thus, the excision of the two interfering tones closely restored the system performance to the performance without interference. In addition to these measurements, simulation results yielded the same conclusion.

The measurements and simulations used interference values that were within the linear operating range of the measurement instrumentation so that the additional impacts of nonlinear operation were not observed. The CDMA signal used in these measurements contained a spreading code to broaden its response but did not use error correction coding to reduce the interference effects as observed by the BER measurements. Normally such coding would have restored the BER performance and the effect of the interference would not be noticeable. The present invention has emphasized the need to excise high level interference to maintain linear system operation and described a method to determine an interference threshold for that purpose. In some CDMA applications where the processing gain of the CDMA waveform is not adequate to restore the BER performance without interference, reducing the interference threshold level to excise additional interference components may be advantageous.

Thus, it may be seen that excising interference in the manner described herein, e.g., using system 100 illustrated in FIGS. 1A-1B to implement method 200 illustrated in FIG. 2, may substantially reduce the BER of broad bandwidth, multiplexed signals, and thus may facilitate transmission, reception, demultiplexing, and decoding of such signals.

While various illustrative embodiments of the invention are described above, it will be apparent to one skilled in the art that various changes and modifications may be made therein without departing from the invention. For example, interference reduction system 100 may be configured to work with, and to be coupled to, a pre-existing receiver 10 or transponder 10', but need not necessarily be considered to be an integral part of such a receiver or transponder, and indeed suitably may be used with any circuitry that would benefit from interference reduction. The appended claims are intended to cover all such changes and modifications that fall within the true spirit and scope of the invention.

What is claimed:

1. A system for processing a group of signals and interference, the system comprising:
   (a) an analog-to-digital (A/D) converter configured to digitize the group of signals and the interference;
   (b) a Fourier transform circuit coupled to the A/D converter and configured to obtain a Fourier transform of the digitized group of signals and the interference and to provide as output spectral bins, each bin having a power level, at least some of the bins respectively containing portions of the digitized group of signals, and at least one of the bins containing the interference;
   (c) a power analysis circuit configured (i) to compare the collective power level of the spectral bins output by the Fourier transform circuit to a predetermined threshold, and if the collective power level exceeds the predetermined threshold, (ii) to obtain a dynamically defined threshold having a value that, if spectral bins having power levels exceeding that threshold are excised, would reduce the collective power level to or below the predetermined threshold, and (iii) to excise at least one spectral bin that contains the interference and exceeds the dynamically defined threshold; and
   (d) an inverse Fourier transform circuit configured to obtain an inverse Fourier transform of the remaining spectral bins and to provide as output a digitized group of signals less the interference in any excised spectral bin.

2. The system of claim 1, wherein the power analysis circuit comprises a first arithmetic circuit configured to obtain the collective power level, a storage medium configured to store the predetermined threshold, and a first comparator configured to compare the collective power level to the stored predetermined threshold.

3. The system of claim 2, wherein the power analysis circuit further comprises a second arithmetic circuit configured to obtain the dynamically defined threshold, and a second comparator configured to compare the power level of each bin to the dynamically defined threshold and to excise any bin whose power level exceeds that threshold.

4. The system of claim 2, wherein the power analysis circuit comprises a field programmable gate array (FPGA) or application specific integrated circuit (ASIC) suitably programmed so as to include the first and second arithmetic circuits, the storage medium, and the first and second comparators.

5. The system of claim 1, wherein the power analysis circuit is configured to excise spectral bins having power levels that exceed the dynamically defined threshold by setting the power levels of those bins to zero.

6. The system of claim 1, wherein the power analysis circuit further is configured to compare the power level of each spectral bin to an empty bin threshold, and if the power level of a bin is less than the empty bin threshold, excising that bin.

7. The system of claim 1, wherein the group of signals comprise code-division multiple access (CDMA) or frequency-division multiple access (FDMA)-based signals.

8. The system of claim 1, further comprising an amplifier configured to amplify the digitized group of signals output by the inverse Fourier transform circuit and an antenna configured to transmit the amplified, digitized group of signals output by the amplifier.

9. The system of claim 1, further comprising a demultiplexer configured to demultiplex the digitized group of signals output by the inverse Fourier transform circuit, at least one antenna, and at least one router configured to route the demultiplexed signals to the at least one antenna based on the intended destination thereof.

10. The system of claim 1, wherein the A/D converter is configured to remain in its linear range for the highest anticipated interference level.

11. A method of processing a received group of signals and interference, the method comprising:
    (a) digitizing the received group of signals and the interference;
    (b) obtaining a Fourier transform of the digitized group of signals and the interference to output spectral bins, each bin having a power level, at least some of the bins respectively containing portions of the digitized group of signals, and at least one of the bins containing the interference;
    (c) (i) comparing the collective power level of the spectral bins to a predetermined threshold, and if the collective power level exceeds the predetermined threshold, obtaining a dynamically defined threshold having a value that, if spectral bins having power levels exceeding that threshold are excised, would reduce the collective power level to or below the predetermined threshold, and (iii) excising at least one bin that contains the interference and exceeds the dynamically defined threshold; and
    (d) obtaining an inverse Fourier transform of the remaining spectral bins and providing as output a digitized group of signals less the interference in any excised spectral bin.

12. The method of claim 11, further comprising programming a field programmable gate array (FPGA) or application-specific integrated circuit (ASIC) to execute step (c).

13. The method of claim 11, wherein excising the spectral bins having power levels that exceed the dynamically defined threshold comprises setting the power levels of those bins to zero.

14. The method of claim 11, further comprising comparing the power level of each spectral bin to an empty bin threshold, and if the power level of a bin is less than the empty bin threshold, excising that bin.

15. The method of claim 11, wherein the group of signals comprise code-division multiple access (CDMA) or frequency-division multiple access (FDMA)-based signals.

16. The method of claim 11, further comprising amplifying the digitized group of signals output by the inverse Fourier transform circuit and transmitting with an antenna the amplified, digitized group of signals.

17. The method of claim 11, further comprising demultiplexing the digitized group of signals output by the inverse Fourier transform circuit and routing the demultiplexed signals to at least one antenna based on the intended destination thereof.

18. The method of claim 11, comprising executing step (a) using an A/D converter configured to remain linear for the highest anticipated interference level.

19. A system for processing a group of signals and interference, the system comprising:
    (a) an analog-to-digital (A/D) converter configured to digitize the group of signals and the interference;
    (b) a Fourier transform circuit coupled to the A/D converter and configured to obtain a Fourier transform of the digitized group of signals and the interference and to provide as output spectral bins, each bin having a power level, at least some of the bins respectively containing portions of the digitized group of signals, and at least one of the bins containing the interference;

(c) a power analysis circuit configured to compare the collective power level of the spectral bins output by the Fourier transform circuit to a predetermined threshold, and if the collective power level exceeds the predetermined threshold, to excise at least one bin that contains the interference;

(d) an inverse Fourier transform circuit configured to obtain an inverse Fourier transform of the remaining spectral bins and to provide as output a digitized group of signals less the interference in any excised spectral bin; and (e) an amplifier configured to amplify the digitized group of signals output by the inverse Fourier transform circuit and an antenna configured to transmit the amplified, digitized group of signals output by the amplifier.

20. A system for processing a group of signals and interference, the system comprising:

(a) an analog-to-digital (A/D) converter configured to digitize the group of signals and the interference;

(b) a Fourier transfoun circuit coupled to the A/D converter and configured to obtain a Fourier transform of the digitized group of signals and the interference and to provide as output spectral bins, each bin having a power level, at least some of the bins respectively containing portions of the digitized group of signals, and at least one of the bins containing the interference;

(c) a power analysis circuit configured to compare the collective power level of the spectral bins output by the Fourier transform circuit to a predetermined threshold, and if the collective power level exceeds the predetermined threshold, to excise at least one bin that contains the interference;

(d) an inverse Fourier transform circuit configured to obtain an inverse Fourier transform of the remaining spectral bins and to provide as output a digitized group of signals less the interference in any excised spectral bin; and (e) a demultiplexer configured to demultiplex the digitized group of signals output by the inverse Fourier transform circuit, at least one antenna, and at least one router configured to route the demultiplexed signals to the at least one antenna based on the intended destination thereof.

21. A system for processing a group of signals and interference, the system comprising:

(a) an analog-to-digital (A/D) converter configured to digitize the group of signals and the interference;

(b) a Fourier transform circuit coupled to the A/D converter and configured to obtain a Fourier transform of the digitized group of signals and the interference and to provide as output spectral bins, each bin having a power level, at least some of the bins respectively containing portions of the digitized group of signals, and at least one of the bins containing the interference;

(c) a power analysis circuit configured to compare the collective power level of the spectral bins output by the Fourier transform circuit to a predetermined threshold, and if the collective power level exceeds the predetermined threshold, to excise at least one bin that contains the interference; and (d) an inverse Fourier transform circuit configured to obtain an inverse Fourier transform of the remaining spectral bins and to provide as output a digitized group of signals less the interference in any excised spectral bin, wherein the A/D converter is configured to remain in its linear range for the highest anticipated interference level.

22. A method of processing a received group of signals and interference, the method comprising:

(a) digitizing the received group of signals and the interference;

(b) obtaining a Fourier transform of the digitized group of signals and the interference to output spectral bins, each bin having a power level, at least some of the bins respectively containing portions of the digitized group of signals, and at least one of the bins containing the interference;

(c) comparing the collective power level of the spectral bins to a predetermined threshold, and if the collective power level exceeds the predetermined threshold, excising at least one bin that contains the interference;

(d) obtaining an inverse Fourier transform of the remaining spectral bins and providing as output a digitized group of signals less the interference in any excised spectral bin; and (e) comparing the power level of each spectral bin to an empty bin threshold, and if the power level of a bin is less than the empty bin threshold, excising that bin.

23. A method of processing a received group of signals and interference, the method comprising:

(a) digitizing the received group of signals and the interference;

(b) obtaining a Fourier transform of the digitized group of signals and the interference to output spectral bins, each bin having a power level, at least some of the bins respectively containing portions of the digitized group of signals, and at least one of the bins containing the interference;

(c) comparing the collective power level of the spectral bins to a predetermined threshold, and if the collective power level exceeds the predetermined threshold, excising at least one bin that contains the interference;

(d) obtaining an inverse Fourier transform of the remaining spectral bins and providing as output a digitized group of signals less the interference in any excised spectral bin; and (e) amplifying the digitized group of signals output by the inverse Fourier transform circuit and transmitting with an antenna the amplified, digitized group of signals.

24. A method of processing a received group of signals and interference, the method comprising:

(a) digitizing the received group of signals and the interference;

(b) obtaining a Fourier transform of the digitized group of signals and the interference to output spectral bins, each bin having a power level, at least some of the bins respectively containing portions of the digitized group of signals, and at least one of the bins containing the interference;

(c) comparing the collective power level of the spectral bins to a predetermined threshold, and if the collective power level exceeds the predetermined threshold, excising at least one bin that contains the interference;

(d) obtaining an inverse Fourier transform of the remaining spectral bins and providing as output a digitized group of signals less the interference in any excised spectral bin; and (e) demultiplexing the digitized group of signals output by the inverse Fourier transform circuit and routing the demultiplexed signals to at least one antenna based on the intended destination thereof.

25. A method of processing a received group of signals and interference, the method comprising:
  (a) digitizing the received group of signals and the interference;
  (b) obtaining a Fourier transform of the digitized group of signals and the interference to output spectral bins, each bin having a power level, at least some of the bins respectively containing portions of the digitized group of signals, and at least one of the bins containing the interference;
  (c) comparing the collective power level of the spectral bins to a predetermined threshold, and if the collective power level exceeds the predetermined threshold, excising at least one bin that contains the interference; and
  (d) obtaining an inverse Fourier transform of the remaining spectral bins and providing as output a digitized group of signals less the interference in any excised spectral bin,
  comprising executing step (a) using an A/D converter configured to remain linear for the highest anticipated interference level.

* * * * *